US007970171B2

(12) United States Patent
Lookingbill et al.

(10) Patent No.: US 7,970,171 B2
(45) Date of Patent: Jun. 28, 2011

(54) SYNTHETIC IMAGE AND VIDEO GENERATION FROM GROUND TRUTH DATA

(75) Inventors: Andrew Lookingbill, Pinetop, AZ (US); Emilio Antunez, San Francisco, CA (US); Berna Erol, San Jose, CA (US); Jonathan J. Hull, San Carlos, CA (US); Qifa Ke, Cupertino, CA (US)

(73) Assignee: Ricoh Co., Ltd., Tokyo (JP)

( * ) Notice: Subject to any disclaimer, the term of this patent is extended or adjusted under 35 U.S.C. 154(b) by 1186 days.

(21) Appl. No.: 11/624,466

(22) Filed: Jan. 18, 2007

(65) Prior Publication Data

US 2008/0175507 A1 Jul. 24, 2008

(51) Int. Cl.
*G06K 9/00* (2006.01)

(52) U.S. Cl. ........ 382/103; 382/255; 382/291; 382/292; 382/294

(58) Field of Classification Search .................. 382/100, 382/103, 112, 175, 291, 292, 294, 255
See application file for complete search history.

(56) References Cited

U.S. PATENT DOCUMENTS

| | | | |
|---|---|---|---|
| 1,915,993 A | 6/1933 | Handel | |
| 4,240,572 A | 12/1980 | Mistuhashi | |
| 5,027,421 A | 6/1991 | Kanno | |
| 5,035,302 A | 7/1991 | Thangavelu | |
| 5,077,805 A | 12/1991 | Tan | |
| 5,109,439 A | 4/1992 | Froessl | |
| 5,263,100 A | 11/1993 | Kim et al. | |
| 5,392,447 A | 2/1995 | Schlack et al. | |
| 5,416,892 A | 5/1995 | Loken-Kim | |
| 5,432,864 A | 7/1995 | Lu et al. | |
| 5,465,353 A | 11/1995 | Hull et al. | |
| 5,493,689 A | 2/1996 | Waclawsky et al. | |
| 5,546,502 A | 8/1996 | Hart et al. | |
| 5,553,217 A | 9/1996 | Hart et al. | |
| 5,579,471 A | 11/1996 | Barber et al. | |
| 5,706,097 A | 1/1998 | Schelling et al. | |
| 5,752,055 A | 5/1998 | Redpath et al. | |
| 5,761,344 A | 6/1998 | Al-Hussein | |

(Continued)

FOREIGN PATENT DOCUMENTS

CN 1245935 3/2000

(Continued)

OTHER PUBLICATIONS

European Search Report, European Application No. 09170045.0, Nov. 24, 2009, 4 pages.

(Continued)

*Primary Examiner* — John B Strege
(74) *Attorney, Agent, or Firm* — Patent Law Works LLP

(57) ABSTRACT

A system and a method are disclosed for generating video. Object information is received. A path of motion of the object relative to a reference point is generated. A series of images and ground for a reference frame are generated from the ground truth and the generated path. A system and a method are disclosed for generating an image. Object information is received. Image data and ground truth may be generated using position, the image description, the camera characteristics, and image distortion parameters. A positional relationship between the document and a reference point is determined. An image of the document and ground truth are generated from the object information and the positional relationship and in response to user specified environment of the document.

16 Claims, 21 Drawing Sheets

U.S. PATENT DOCUMENTS

| | | |
|---|---|---|
| 5,806,005 A | 9/1998 | Hull et al. |
| 5,832,474 A | 11/1998 | Lopresti et al. |
| 5,832,530 A | 11/1998 | Paknad et al. |
| 5,873,077 A | 2/1999 | Kanoh et al. |
| 5,892,843 A | 4/1999 | Zhou et al. |
| 5,899,999 A | 5/1999 | De Bonet |
| 5,905,502 A | 5/1999 | Deering |
| 5,956,468 A | 9/1999 | Ancin |
| 5,968,175 A | 10/1999 | Morishita et al. |
| 5,999,915 A | 12/1999 | Nahan et al. |
| 6,035,055 A | 3/2000 | Wang et al. |
| 6,104,834 A | 8/2000 | Hull |
| 6,121,969 A | 9/2000 | Jain et al. |
| 6,138,129 A | 10/2000 | Combs |
| 6,192,157 B1 | 2/2001 | Prebble |
| 6,208,771 B1 | 3/2001 | Jared et al. |
| 6,223,171 B1 | 4/2001 | Chaudhuri et al. |
| 6,253,201 B1 | 6/2001 | Abdel-Mottaleb et al. |
| 6,301,386 B1 | 10/2001 | Zhu et al. |
| 6,332,039 B1 | 12/2001 | Bando et al. |
| 6,363,381 B1 | 3/2002 | Lee et al. |
| 6,393,142 B1 | 5/2002 | Swain et al. |
| 6,397,213 B1 | 5/2002 | Cullen et al. |
| 6,405,172 B1 | 6/2002 | Baker et al. |
| 6,408,257 B1 | 6/2002 | Harrington et al. |
| 6,411,953 B1 | 6/2002 | Ganapathy et al. |
| 6,448,979 B1 | 9/2002 | Schena et al. |
| 6,457,026 B1 | 9/2002 | Graham et al. |
| 6,470,264 B2 | 10/2002 | Bide |
| 6,504,571 B1 | 1/2003 | Narayanaswami et al. |
| 6,537,324 B1 | 3/2003 | Tabata et al. |
| 6,567,799 B2 | 5/2003 | Sweet et al. |
| 6,574,375 B1 | 6/2003 | Cullen et al. |
| 6,574,644 B2 | 6/2003 | Hsu et al. |
| 6,584,223 B1 | 6/2003 | Shiiyama |
| 6,588,039 B1 | 7/2003 | Bates |
| 6,611,862 B2 | 8/2003 | Reisman |
| 6,732,915 B1 | 5/2004 | Nelson et al. |
| 6,751,343 B1 | 6/2004 | Ferrell et al. |
| 6,753,883 B2 | 6/2004 | Schena et al. |
| 6,766,363 B1 | 7/2004 | Rothschild |
| 6,799,201 B1 | 9/2004 | Lee et al. |
| 6,804,332 B1 | 10/2004 | Miner et al. |
| 6,804,659 B1 | 10/2004 | Graham et al. |
| 6,824,057 B2 | 11/2004 | Rathus et al. |
| 6,827,267 B2 | 12/2004 | Rathus et al. |
| 6,830,187 B2 | 12/2004 | Rathus et al. |
| 6,834,804 B2 | 12/2004 | Rathus et al. |
| 6,842,755 B2 | 1/2005 | Maslov |
| 6,843,411 B2 | 1/2005 | Rathus et al. |
| 6,859,909 B1 | 2/2005 | Lerner et al. |
| 6,865,302 B2 | 3/2005 | Chang |
| 6,866,196 B1 | 3/2005 | Rathus et al. |
| 6,880,252 B1 | 4/2005 | Drake |
| 6,929,182 B2 | 8/2005 | Rathus et al. |
| 6,940,491 B2 | 9/2005 | Incertis Carro |
| 6,963,358 B2 | 11/2005 | Cohen et al. |
| 6,964,374 B1 | 11/2005 | Djuknic et al. |
| 6,980,962 B1 | 12/2005 | Arganbright et al. |
| 6,993,573 B2 | 1/2006 | Hunter |
| 7,013,309 B2 | 3/2006 | Chakraborty et al. |
| 7,051,086 B2 | 5/2006 | Rhoads et al. |
| 7,089,487 B2 | 8/2006 | Tsai |
| 7,092,953 B1 | 8/2006 | Haynes |
| 7,167,574 B2 | 1/2007 | Kim |
| 7,185,274 B1 | 2/2007 | Rubin et al. |
| 7,206,820 B1 | 4/2007 | Rhoads et al. |
| 7,232,057 B2 | 6/2007 | Rathus et al. |
| 7,236,632 B2 | 6/2007 | Erol et al. |
| 7,240,279 B1 | 7/2007 | Chartier et al. |
| 7,251,689 B2 | 7/2007 | Wesley |
| 7,263,205 B2 | 8/2007 | Lev |
| 7,305,435 B2 | 12/2007 | Hamynen |
| 7,310,779 B2 | 12/2007 | Carro |
| 7,337,175 B2 | 2/2008 | Comps et al. |
| 7,359,094 B1 | 4/2008 | Sayuda |
| 7,363,580 B2 | 4/2008 | Tabata et al. |
| 7,366,979 B2 | 4/2008 | Spielberg et al. |
| 7,386,789 B2 | 6/2008 | Chao et al. |
| 7,392,287 B2 | 6/2008 | Ratcliff, III |
| 7,406,214 B2 | 7/2008 | Rhoads et al. |
| 7,421,153 B1 | 9/2008 | Ronca et al. |
| 7,421,155 B2 | 9/2008 | King et al. |
| 7,437,023 B2 | 10/2008 | King et al. |
| 7,450,760 B2 | 11/2008 | Molnar et al. |
| 7,489,415 B2 | 2/2009 | Furuta et al. |
| 7,567,262 B1 | 7/2009 | Clemens et al. |
| 7,593,605 B2 | 9/2009 | King et al. |
| 7,613,686 B2 | 11/2009 | Rui |
| 7,644,078 B2 | 1/2010 | Sastry et al. |
| 7,680,850 B2 | 3/2010 | Oda |
| 7,707,039 B2 | 4/2010 | King et al. |
| 7,882,113 B2 | 2/2011 | Yaeger |
| 2001/0011276 A1 | 8/2001 | Durst, Jr. et al. |
| 2001/0013546 A1 | 8/2001 | Ross |
| 2001/0024514 A1 | 9/2001 | Matsunaga |
| 2001/0042030 A1 | 11/2001 | Ito et al. |
| 2001/0042085 A1 | 11/2001 | Peairs et al. |
| 2001/0043741 A1 | 11/2001 | Mahoney et al. |
| 2001/0049700 A1 | 12/2001 | Ichikura |
| 2002/0038430 A1 | 3/2002 | Edwards et al. |
| 2002/0052872 A1 | 5/2002 | Yada |
| 2002/0054059 A1 | 5/2002 | Schneiderman |
| 2002/0073236 A1 | 6/2002 | Helgeson et al. |
| 2002/0102966 A1 | 8/2002 | Lev et al. |
| 2002/0118379 A1 | 8/2002 | Chakraborty et al. |
| 2002/0146176 A1 | 10/2002 | Meyers |
| 2002/0154148 A1 | 10/2002 | Inoue et al. |
| 2002/0157028 A1 | 10/2002 | Koue et al. |
| 2002/0191003 A1 | 12/2002 | Hobgood et al. |
| 2002/0191848 A1 | 12/2002 | Boose et al. |
| 2002/0194264 A1 | 12/2002 | Uchiyama et al. |
| 2003/0025714 A1 | 2/2003 | Ebersole et al. |
| 2003/0110130 A1 | 6/2003 | Pelletier |
| 2003/0110216 A1 | 6/2003 | Althin et al. |
| 2003/0112930 A1 | 6/2003 | Bosik et al. |
| 2003/0121006 A1 | 6/2003 | Tabata et al. |
| 2003/0122922 A1 | 7/2003 | Saffer et al. |
| 2003/0126147 A1 | 7/2003 | Essafi et al. |
| 2003/0151674 A1 | 8/2003 | Lin |
| 2003/0152293 A1 | 8/2003 | Bresler et al. |
| 2003/0193530 A1 | 10/2003 | Blackman et al. |
| 2003/0212585 A1 | 11/2003 | Kyoya et al. |
| 2003/0229857 A1 | 12/2003 | Sayuda et al. |
| 2004/0017482 A1 | 1/2004 | Weitman |
| 2004/0027604 A1 | 2/2004 | Jeran et al. |
| 2004/0042667 A1 | 3/2004 | Lee et al. |
| 2004/0122811 A1 | 6/2004 | Page |
| 2004/0133582 A1 | 7/2004 | Howard et al. |
| 2004/0139391 A1 | 7/2004 | Stumbo et al. |
| 2004/0143644 A1 | 7/2004 | Berton et al. |
| 2004/0199531 A1 | 10/2004 | Kim et al. |
| 2004/0201706 A1 | 10/2004 | Shimizu et al. |
| 2004/0205347 A1 | 10/2004 | Erol et al. |
| 2004/0215689 A1 | 10/2004 | Dooley et al. |
| 2004/0221244 A1 | 11/2004 | Baldino |
| 2004/0238621 A1 | 12/2004 | Beenau et al. |
| 2004/0243514 A1 | 12/2004 | Wankmueller |
| 2004/0260625 A1 | 12/2004 | Usami et al. |
| 2004/0260680 A1 | 12/2004 | Best et al. |
| 2005/0080693 A1 | 4/2005 | Foss et al. |
| 2005/0086188 A1 | 4/2005 | Hillis et al. |
| 2005/0089246 A1 | 4/2005 | Luo |
| 2005/0135483 A1 | 6/2005 | Nair |
| 2005/0160115 A1 | 7/2005 | Starkweather |
| 2005/0165747 A1 | 7/2005 | Bargeron et al. |
| 2005/0182773 A1 | 8/2005 | Feinsmith et al. |
| 2005/0185060 A1 | 8/2005 | Neven |
| 2005/0185225 A1 | 8/2005 | Brawn et al. |
| 2005/0190972 A1 | 9/2005 | Thomas et al. |
| 2005/0198095 A1 | 9/2005 | Du et al. |
| 2005/0216257 A1 | 9/2005 | Tanabe et al. |
| 2005/0234851 A1 | 10/2005 | King et al. |
| 2005/0273812 A1 | 12/2005 | Sakai |
| 2005/0288859 A1 | 12/2005 | Golding et al. |
| 2005/0288911 A1 * | 12/2005 | Porikli .............. 703/2 |
| 2005/0289182 A1 | 12/2005 | Pandian et al. |

| | | |
|---|---|---|
| 2005/0289447 A1 | 12/2005 | Hadley et al. |
| 2006/0002607 A1 | 1/2006 | Boncyk et al. |
| 2006/0012677 A1 | 1/2006 | Neven et al. |
| 2006/0026140 A1 | 2/2006 | King et al. |
| 2006/0041605 A1 | 2/2006 | King et al. |
| 2006/0043188 A1 | 3/2006 | Kricorissian |
| 2006/0061806 A1 | 3/2006 | King et al. |
| 2006/0070120 A1 | 3/2006 | Aoki et al. |
| 2006/0074828 A1 | 4/2006 | Heumann et al. |
| 2006/0085477 A1 | 4/2006 | Phillips et al. |
| 2006/0104515 A1 | 5/2006 | King et al. |
| 2006/0112092 A1 | 5/2006 | Ziou et al. |
| 2006/0116555 A1 | 6/2006 | Pavlidis et al. |
| 2006/0119880 A1 | 6/2006 | Danekar et al. |
| 2006/0122884 A1 | 6/2006 | Graham et al. |
| 2006/0122983 A1 | 6/2006 | King et al. |
| 2006/0140475 A1 | 6/2006 | Chin et al. |
| 2006/0143176 A1 | 6/2006 | Mojsilovic et al. |
| 2006/0190812 A1 | 8/2006 | Ellenby et al. |
| 2006/0200480 A1 | 9/2006 | Harris et al. |
| 2006/0227992 A1 | 10/2006 | Rathus et al. |
| 2006/0240862 A1 | 10/2006 | Neven et al. |
| 2006/0251292 A1 | 11/2006 | Gokturk et al. |
| 2006/0251339 A1 | 11/2006 | Gokturk et al. |
| 2006/0253439 A1 | 11/2006 | Ren et al. |
| 2006/0253491 A1 | 11/2006 | Gokturk et al. |
| 2006/0262352 A1 | 11/2006 | Hull et al. |
| 2006/0262962 A1 | 11/2006 | Hull et al. |
| 2006/0262976 A1 | 11/2006 | Hart et al. |
| 2006/0285172 A1 | 12/2006 | Hull et al. |
| 2006/0285755 A1 | 12/2006 | Hager et al. |
| 2006/0285772 A1 | 12/2006 | Hull et al. |
| 2006/0286951 A1 | 12/2006 | Nagamoto et al. |
| 2006/0294049 A1 | 12/2006 | Sechrest et al. |
| 2007/0041668 A1 | 2/2007 | Todaka |
| 2007/0053513 A1 | 3/2007 | Hoffberg |
| 2007/0115373 A1 | 5/2007 | Gallagher et al. |
| 2007/0150466 A1 | 6/2007 | Brave et al. |
| 2007/0175998 A1 | 8/2007 | Lev |
| 2007/0233613 A1 | 10/2007 | Barrus et al. |
| 2007/0271247 A1 | 11/2007 | Best et al. |
| 2007/0276845 A1 | 11/2007 | Geilich |
| 2008/0010605 A1 | 1/2008 | Frank |
| 2008/0071767 A1 | 3/2008 | Grieselhuber et al. |
| 2009/0235187 A1 | 9/2009 | Kim et al. |
| 2010/0013615 A1 | 1/2010 | Hebert et al. |

FOREIGN PATENT DOCUMENTS

| | | |
|---|---|---|
| EP | 0706283 A | 4/1996 |
| EP | 1229496 A2 | 8/2002 |
| EP | 1555626 A2 | 7/2005 |
| EP | 1662064 A1 | 5/2006 |
| EP | 1783681 | 5/2007 |
| JP | 10-228468 A | 8/1998 |
| JP | 2000-165645 A | 6/2000 |
| JP | 2001230916 | 8/2001 |
| WO | WO 99/05658 A1 | 2/1999 |
| WO | WO 2004/072897 A2 | 8/2004 |
| WO | WO 2005/043270 A2 | 5/2005 |
| WO | WO 2007/073347 A1 | 6/2007 |

OTHER PUBLICATIONS

Roth, M.T. et al., "The Garlic Project," Proc. of the 1996 ACM SIGMOD International Conference on Management of Data, Montreal, Quebec, Canada, Jun. 4, 1996, pp. 557.
Aggarwal, M et al, "On Cosine-fourth and Vignetting Effects in Real Lenses," ICCV Proceedings, IEEE, 2001, vol. 1, pp. 472-479, [online] Retrieved from the Internet<URL: http://www.metaverselab.org/classis/635/reading/aggarwal-iccv.pdf>.
Akenine-Moller, T. et al., "Real-Time Rendering," A.K. Peters, Natick, MA, $2^{nd}$ Edition, 2002, pp. 70-84.
Baba, M. et al., "Shadow Removal from a Real Image Based on Shadow Density," Poster at SIGGRAPH2004, Updated Aug. 16, 2004, 4 pages, [online] Retrieved from the Internet<URL:http://www.cv.its.hiroshima-cu.ac.jp/baba/Shadow/poster04-02.pdf>.
Baird, H.S., "Document Image Defect Models and Their Uses," Proc., IAPR $2^{nd}$ International Conference on Document Analysis and Recognition, Tsukuba Science City, Japan, Oct. 20-22, 1993, 7 pages.
Baird, H., "Document Image Defect Models," in Proc. Of IAPR Workshop on Syntactic and Structural Pattern Recognition, Murray Hill, NJ, Jun. 1990, Structured Document Image Analysis, Springer-Verlag, pp. 546-556.
Baird, H., "The State of the Art of Document Image Degradation Modeling," In Proc. Of the $4^{th}$ IAPR International Workshop on Document Analysis Systems, Rio de Janeiro, Brazil, 2000, pp. 1-16, [online] Retrieved from the Internet<URL:http://www2.parc.xerox.com/istl/members/baird/das00.pas.gz>.
Barney Smith, E.H. et al., "Text Degradations and OCR Training," International Conference on Document Analysis and Recognition 2005, Seoul, Korea, Aug. 2005, 5 pages, [online] Retrieved from the Internet<URL:http://coen.boisestate.edu/EBarneySmith/Papers/ICDAR05_submit.pdf>.
Bouget, J., "Camera Calibration Toolbox for Matlab," Online Source, Updated Jul. 24, 2006, 6 pages, [online] Retrieved from the Internet<URL:http:www.vision.caltech.edu/bougetj/calib_doc/index.html#ref>.
Boyd, S., "EE263: Introduction to Linear Dynamical Systems," Online Lecture Notes, Stanford University, Spring Quarter, 2006-2007, Accessed on Sep. 11, 2006, 4 pages, [online] Retrieved from the Internet<URL:http://www.standford/edu/class/ee263/#lectures>.
Constantini, R. et al., "Virtual Sensor Design," Proceedings of the SPIE, vol. 5301, 2004, pp. 408-419, Retrieved from the Internet<URL:http://ivrgwww.epfl.ch/publications/cs04.pdf>.
Doermann, D. et al., "Progress in Camera-Based Document Image Analysis," Proceedings of the Seventh International Conference on Document Analysis and Recognition, ICDAR 2003, 11 pages, [online] Retrieved from the Internet<URL:http://www.cse.salford.ac.uk/prima/ICDAR2003/Papers/0111_keynote_III_doermann_d.pdf>.
Ho, T.K. et al., "Evaluation of OCT Accuracy Using Synthetic Data," Proceedings of the $4^{th}$ Annual Symposium on Document Analysis and Information Retrieval, Apr. 24-26, 1995, pp. 413-422. [online] Retrieved from the Internet<URL:http://citeseer.ist.psu.edu/cache/papers/cs/2303/http:zSzzSzcm.bell-labs.comzSzcmzSzcszSzwhozSzhsbzSzeoasd.pdf/ho95evaluation.pdf>.
Kanungo, T. et al., "A Downhill Simplex Algorithm for Estimating Morphological Degradation Model Parameters," University of Maryland Technical Report, LAMP-RT-066, Feb. 2001, 15 pages, [online] Retrieved from the Internet<URL:http://lampsrv01.umiacs.umd.edu/pubs/TechReports/LAMP_066/LAMP_066.pdf>.
Kanungo, T. et al., "Global and Local Document Degradation Models," Document Analysis and Recognition, 1993, Proceedings of the Second International Conference on Volume, Oct. 20-22, 1993, pp. 730-734.
Khoubyari, S. et al., "Keyword Location and Noisy Document Images," Second Annual Symposium on Document Analysis and Information Retrieval, Las Vegas, NV, Apr. 26-28, 1993, pp. 217-231.
Li, Y. et al., "Validation of Image Defect Models for Optical Character Recognition," IEEE Trans. Pattern Anal. Mach. Intell. 18, 2, Feb. 1996, pp. 99-108, [online] Retrieved from the Internet<URL:http://www.cs.cmu.edu/afs/cs/usr/andrewt/papers/Validate/journal.ps.gz>.
Liang, J. et al., "Flattening Curved Documents in Images," In Proc. Of the IEEE Conf. on Computer Vision and Pattern Recognition (CVPR), 2005, 8 pages, [online] Retrieved from the Internet<URL:http://www.cfar.umd.edu/~daniel/daniel_papersfordownload/liang-j_cpvr2005.pdf>.
Pavlidis, T., "Effects of Distortions on the Recognition Rate of a Structural OCR System," In Pro. Conf. on Comp. Vision and Pattern Recog., IEEE, Washington, DC, 1983, pp. 303-309.
Sato, T. et al., "High Resolution Video Mosaicing for Documents and Photos by Estimating Camera Motion," Proceedings of the SPIE 5299, 246, 2004, 8 pages, [online] Retrieved from the Internet<URL:http://yokoya.naist.jp/paper/datas/711/spie2004.pdf>.

Stoyanov, D., "Camera Calibration Tools," Online Source, Updated Aug. 24, 2006, Accessed Aug. 31, 2006, 12 pages, [online] Retrieved from the Internet<URL:http://ubimon.doc.ic.ac.uk/dvs/index.php?m=581>.

Zhang, Z., "A Flexible New Technique for Camera Calibration," IEEE Transactions on Pattern Analysis and Machine Intelligence, Nov. 2000, pp. 1330-1334, vol. 22, No. 11.

Zi, G., "Groundtruth Generation and Document Image Degradation," University of Maryland Language and Media Processing Laboratory Technical report (LAMP-TR-121), May 2005, 72 pages, [online] Retrieved from the Internet<URL:http://lampsrv01.umiacs.umd.edu/pubs/TechReports/LAMP_121/LAMP_121.pdf>.

Erol, B. et al., "Linking Presentation Documents Using Image Analysis," IEEE, Nov. 9-12, 2003, pp. 97-101, vol. 1.

Hull, J.J. et al., "Visualizing Multimedia Content on Paper Documents: Components of Key Frame Selection for Video Paper," Proceedings of the Seventh International Conference on Document Analysis and Recognition (ICDAR'03), IEEE, 2003, 4 pages.

U.S. Appl. No. 10/813,901, filed Mar. 30, 2004, Erol et al.

Archive of "Barcodepedia.com—the online barcode database," [online] [Archived by http://archive.org on Jul. 9, 2006; Retrieved on Aug. 18, 2008] Retrieved from the Internet<http://web.archive.org/web/20060709101455/http://en.barcodepedia.com/>.

Boukraa, M. et al., "Tag-Based Vision: Assisting 3D Scene Analysis with Radio-Frequency Tags," Jul. 8, 2002, Proceedings of the Fifth International Conference on Information Fusion, Piscataway, N.J., IEEE, Jul. 8-11, 2002, pp. 412-418.

Brassil, J. et al., "Hiding Information in Document Images," Proc. Conf. Information Sciences and Systems (CISS-95), Mar. 1995, Johns Hopkins University, Baltimore, MD, pp. 482-489.

"Call for Papers: ICAT 2007," 17$^{th}$ International Conference on Artificial Reality and Telexistence, 2007, [Online] [Retrieved on Nov. 4, 2008] Retrieved from the Internet<URL:http://www.idemployee.id.tue.nl/g.w.m.rauterberg/conferences/ICAT2007-CfP.pdf>.

Cover, T.M. et al., "Nearest Neighbor Pattern Classification," IEEE Transactions on Information Theory, Jan. 1967, pp. 21-27, vol. IT-13, No. 1.

Davis, M. et al., "Towards Context-Aware Face Recognition," Proceedings of the13th Annual ACM International Conference on Multimedia, Nov. 6-11, 2005, pp. 483-486, vol. 13.

Erol, B. et al., "Linking Multimedia Presentations with Their Symbolic Source Documents: Algorithm and Applications," Nov. 2-8, 2003, pp. 498-507, [Online] [Retrieved on Oct. 15, 2008] Retrieved from the Internet<URL:http://rii.ricoh.com/{hull/pubs/p225_erol.pdf>.

Esposito, F. et al., "Machine Learning Methods for Automatically Processing Historical Documents: from Paper Acquisition to XML Transformation," Proceedings of the First International Workshop on Document Image Analysis for Libraries (DIAL '04), IEEE, 2004, pp. 1-8.

European Partial Search Report, European Application No. EP07015093.3, Dec. 17, 2007, 7 pages.

European Search Report, European Application No. 08160125.4, Oct. 13, 2008, 5 pages.

European Search Report, European Application No. 06796845.3, Oct. 30, 2008, 12 pages.

European Search Report, European Application No. 06796844.6, Oct. 30, 2008, 12 pages.

European Search Report, European Application No. 06796848.7, Oct. 31, 2008, 12 pages.

European Search Report, European Application No. 06796846.1, Nov. 5, 2008, 11 pages.

European Search Report, European Application No. 08159971.4, Nov. 14, 2008, 6 pages.

European Search Report, European Application No. 08160115.5, Nov. 12, 2008, 6 pages.

European Search Report, European Application No. 08160130.4, Nov. 12, 2008, 7 pages.

European Search Report, European Application No. 08160112.2, Nov. 10, 2008, 7 pages.

European Search Report, European Application No. 07252397, Oct. 15, 2007, 7 pages.

Ho, T.K. et al., "Decision Combination in Multiple Classifier Systems," IEEE Transactions on Pattern Analysis and Machine Intelligence, Jan. 1994, pp. 66-75, vol. 16, No. 1.

Hull, J.J., "Document Image Matching and Retrieval with Multiple Distortion-Invariant Descriptors," International Association for Pattern Recognition Workshop on Document Analysis Systems, Jan. 1, 1995, pp. 375-396.

Hull, J.J. et al., "Document Image Matching Techniques," Apr. 30, 1997, pp. 31-35, [Online] [Retrieved on May 2, 1997] Retrieved from the Internet<URL:http://rii.ricoh.com/hull/pubs/hull_sdiut97.pdf>.

Hull, J. J., "Document Image Similarity and Equivalence Detection," International Journal on Document Analysis and Recognition, 1998, pp. 37-42, Springer-Verlag.

Hull, J., "Document Image Skew Detection: Survey and Annotated Bibliography," Document Analysis Systems II, World Scientific, 1998, pp. 40-64.

Hull, J.J. et al., "Paper-Based Augmented Reality," 17$^{th}$ International Conference on Artificial Reality and Telexistence, Nov. 1, 2007, pp. 205-209.

Khoubyari, S. et al., "Font and Funct on Word Ident ficat on n Document Recogn t on," Computer Vision and Image Understanding, Jan. 1996, pp. 66-74, vol. 63, No. 1.

Kopec, G.E. et al., "Document Image Decoding Using Markov Source Models," IEEE Transactions on Pattern Analysis and Machine Intelligence, Jun. 1994, pp. 602-617, vol. 16, No. 6.

Lu, Y. et al., "Document Retrieval from Compressed Images," Pattern Recognition, 2003, pp. 987-996, vol. 36.

McDonald, G., "Third Voice: Invisible Web Graffiti," PC World, May 18, 1999, [online] [Retrieved on Nov. 14, 2006] Retrieved from the Internet<URL:http://www.pcworld.com/news/article/0,aid,11016,00.asp>.

Microsoft Computer Dictionary (5$^{th}$ ed.), 2002, "Hyperlink" Definition, pp. 260-261.

"Mobile Search Engines," Sonera MediaLab, Nov. 15, 2002, pp. 1-12.

"Mobile Video Managed Service," Vidiator, 2008, [online] [Retrieved on Aug. 29, 2008] Retrieved from the Internet<URL:http://www.vidiator.com/services/managed_mobile_video.aspx>.

Mukherjea, S. et al., "AMORE: A World Wide Web Image Retrieval Engine," C&C Research Laboratories, NEC USA Inc., Baltzer Science Publishers BV, World Wide Web 2, 1999, pp. 115-132.

PCT International Search Report and Written Opinion, PCT/JP2006/316810, Oct. 10, 2006, 9 pages.

PCT International Search Report and Written Opinion, PCT/JP2006/316811, Oct. 10, 2006, 9 pages.

PCT International Search Report and Written Opinion, PCT/JP2006/316812, Oct. 10, 2006, 9 pages.

PCT International Search Report and Written Opinion, PCT/JP2006/316814, Oct. 10, 2006, 11 pages.

Schalkoff, R.J., "Syntactic Pattern Recognition (SYNTPR) Overview," Pattern Recognition: Statistical, Structural and Neural Approaces, Jan. 1, 1992, pp. 127-150, vol. 3, Wiley.

Sivic, J. et al., "Video Google: A Text Retrieval Approach to Object Matching in Videos," Proceedings of the Ninth IEEE International Conference on Computer Vision (ICCV 2003), 2-Volume Set, 2003, IEEE, pp. 1-8.

Veltkamp, R. et al., "Content-Based Image Retrieval Systems: A Survey," Department of Computing Science, Utrecht University, Oct. 28, 2002, pp. 1-62.

Wikipedia Online Definition, "Optical Character Recognition," Sep. 14, 2008, pp. 1-7, [online] [Retrieved on Sep. 14, 2008] Retrieved from the Internet<URL:http://en.wikipedia.org/wiki/Optical_character_recognition>.

Wikipedia Online Encyclopedia,"Automatic Identification and Data Capture," Jul. 21, 2008, pp. 1-2, [Online] [Retrieved on Sep. 27, 2008] Retrieved from the Internet<URL:http://en.wikipedia.org/wiki/Automatic_identification_and_data_capture>.

Zheng, Q.-F. et al., "Effective and Efficient Object-Based Image Retrieval Using Visual Phases," Proceedings of the 14$^{th}$ Annual ACM International Conference on Multimedia, MM'06, Oct. 23-27, 2006, Santa Barbara, CA, pp. 77-80.

Archive of Scanbuy Solutions | Optical Intelligence for your Mobile Devices, Scanbuy® Inc., www.scanbuy.com/website/solutions_summary.htm, [Online] [Archived by http://archive.org on Jun. 19, 2006; Retrieved on Mar. 3, 2009] Retrieved from the Internet<URL:http://web.archive.org/web/20060619172549/http://www.scanbuy.com/website/solutions_su...>.

Canny, J., "A Computational Approach To Edge Detection," IEEE Transactions on Pattern Analysis and Machine Intelligence, Nov. 1986, pp. 679-714, vol. PAMI-8, No. 6.

Di Stefano, L. et al., "A Simple and Efficient Connected Components Labeling Algorithm," International Conference on Image Analysis and Processing, 1999, pp. 322-327.

Duda, R. O. et al., "Use Of The Hough Transformation To Detect Lines And Curves In Pictures," Communications of the ACM, Jan. 1972, pp. 11-15, vol. 15, No. 1.

Erol, B. et al., "Prescient Paper: Multimedia Document Creation with Document Image Matching," 17$^{th}$ International Conference on Pattern Recognition, Aug. 23-26, 2004, Cambridge, UK.

Erol, B. et al., "Retrieval of Presentation Recordings with Digital Camera Images," IEEE Conference on Computer Vision and Pattern Recognition, Jun. 27-Jul. 2, 2004.

Ezaki, N. et al., "Text Detection from Natural Scene Images: Towards A System For Visually Impaired Persons," Proc. of 17th Int. Conf. on Pattern Recognition (ICPR 2004), IEEE Computer Society, Aug. 23-26, 2004, Cambridge, UK, pp. 683-686, vol. II.

Fadoua, D. et al., "Restoring Ink Bleed-Through Degraded Document Images Using a Recursive Unsupervised Classification Technique," Lecture Notes in Computer Science 3872, Document Analysis Systems VII, 7$^{th}$ International Workshop, DAS 2006, Feb. 13-15, 2006, Nelson, New Zealand, Bunke, H. et al. (eds.), pp. 38-49.

Freund, Y. et al., "A Short Introduction To Boosting," Journal of Japanese Society for Artificial Intelligence, Sep. 1999, pp. 771-780, vol. 14, No. 5.

Hjelmas, E. et al., "Face Detection: A Survey," Computer Vision and Image Understanding, 2001, pp. 236-274, vol. 83.

Hull, J.J., "Document Image Matching on CCITT Group 4 Compressed Images," SPIE Conference on Document Recognition IV, Feb. 8, 1997, pp. 82-87.

Jagannathan, L. et al., Perspective Correction Methods For Camera Based Document Analysis, Proc. First Int. Workshop on Camera-based Document Analysis and Recognition, 2005, pp. 148-154.

Jain, A.K. et al., "An Introduction to Biometric Recognition," IEEE Transactions on Circuits and Systems for Video Technology, Jan. 2004, pp. 4-20, vol. 14, No. 1.

Po, L-M. et al., "A Novel Four-Step Search Algorithm for Fast Block Motion Estimation," IEEE Transactions on Circuits and Systems for Video Technology, Jun. 1996, pp. 313-317, vol. 6, Issue 3.

Rangarajan, K. et al. "Optimal Corner Detector," 1988, IEEE, pp. 90-94.

Rosin, P.L. et al., "Image Difference Threshold Strategies And Shadow Detection," Proceedings of the 6$^{th}$ British Machine Vision Conference, 1995, 10 pages.

Sezgin, M. et al., "Survey Over Image Thresholding Techniques And Quantitative Performance Evaluation," Journal of Electronic Imaging, Jan. 2004, pp. 146-165, vol. 13, No. 1.

Triantafyllidis, G.A. et al., "Detection Of Blocking Artifacts Of Compressed Still Images," Proceedings of the 11$^{th}$ International Conference on Image Analysis and Processing (ICIAP '01), IEEE, 2001, pp. 1-5.

U.S. Appl. No. 10/696,735, filed Oct. 28, 2003, Erol, B. et al., "Techniques for Using a Captured Image for the Retrieval of Recorded Information," 58 pages.

Zanibbi, R. et al. "A Survey Of Table Recognition," International Journal on Document Analysis and Recognition, 2004, pp. 1-33.

Zhao, W. et al., Face Recognition: A Literature Survey, ACM Computing Surveys (CSUR), 2003, pp. 399-458, vol. 35, No. 4.

Liu, Y. et al., "Automatic Texture Segmentation for Texture-Based Image Retrieval," IEEE, Jan. 5-7, 2004, pp. 285-288.

Liu, T. et al., "A Fast Image Segmentation Algorithm for Interactive Video Hotspot Retrieval," IEEE, 2001, pp. 3-8.

Wikipedia Online Encyclopedia, "Image Scanner," Last Modified Feb. 9, 2010, pp. 1-9, [Online] [Retrieved on Feb. 13, 2010] Retrieved from the Internet<URL:http://en.wikipedia.org/wiki/Image_scanner>.

Wikipedia Online Encyclopedia, "Waypoint," Last Modified Feb. 13, 2010, pp. 1-4, [Online] Retrieved on Feb. 13, 2010] Retrieved from the Internet<URL:http://en.wikipedia.org/wiki/Waypoint>.

European Search Report, European Application No. 09156089.6, Jun. 19, 2009, 8 pages.

Marques, O. et al., "Content-Based Image and Video Retrieval, Video Content Representation, Indexing, and Retrieval, a Survey of Content-Based Image Retrieval Systems, CBVQ (Content-Based Visual Query)," Content-Based Image and Video Retrieval [Multimedia Systems and Applications Series], Apr. 1, 2002, pp. 15-117, vol. 21, Kluwer Academic Publishers Group, Boston, USA.

Photograph of hole punch and embellishment setting device manufactured by Kangaro, Model EP-20, date unknown.

United States Office Action, U.S. Appl. No. 11/827,530, Jun. 9, 2010, 35 pages.

United States Office Action, U.S. Appl. No. 11/461,294, Jun. 11, 2010, 19 pages.

United States Office Action, U.S. Appl. No. 11/461,300, Jun. 11, 2010, 20 pages.

United States Office Action, U.S. Appl. No. 11/461,024, Jul. 14, 2010, 29 pages.

United States Office Action, U.S. Appl. No. 11/461,049, Jul. 28, 2010, 27 pages.

United States Office Action, U.S. Appl. No. 11/461,279, Aug. 5, 2010, 37 pages.

United States Office Action, U.S. Appl. No. 11/461,286, Aug. 5, 2010, 28 pages.

United States Office Action, U.S. Appl. No. 12/240,596, Aug. 6, 2010, 32 pages.

Japanese Office Action, Japanese Application No. 2004-293962, Aug. 24, 2010, 3 pages.

Extended European Search Report, Application No. 09178280.5-2201/2202646, Aug. 31, 2010, 6 pages.

United States Office Action, U.S. Appl. No. 11/461,143, Aug. 18, 2010, 9 pages.

United States Office Action, U.S. Appl. No. 11/461,272, Aug. 23, 2010, 31 pages.

United States Office Action, U.S. Appl. No. 11/461,126, filed Sep. 3, 2010, 28 pages.

United States Notice of Allowance, U.S. Appl. No. 11/461,095, filed Sep. 27, 2010, 29 pages.

United States Office Action, U.S. Appl. No. 12/060,194, filed Oct. 1, 2010, 29 pages.

United States Office Action, U.S. Appl. No. 11/461,294, filed Oct. 7, 2010, 17 pages.

United States Office Action, U.S. Appl. No. 11/461,300, filed Oct. 6, 2010, 20 pages.

United States Office Action, U.S. Appl. No. 11/827,530, filed Oct. 7, 2010, 21 pages.

United States Notice of Allowance, U.S. Appl. No. 11/461,091, filed Oct. 18, 2010, 31 pages.

United States Notice of Allowance, U.S. Appl. No. 11/461,024, filed Nov. 15, 2010, 10 pages.

United States Notice of Allowance, U.S. Appl. No. 11/461,049, filed Nov. 16, 2010, 10 pages.

United States Notice of Allowability, U.S. Appl. No. 11/461,091, filed Nov. 17, 2010, 22 pages.

United States Office Action, U.S. Appl. No. 11/777,142, filed Nov. 10, 2010, 17 pages.

U.S. Office Action, U.S. Appl. No. 11/776,520, filed Dec. 7, 2010, 43 pages.

U.S. Office Action, U.S. Appl. No. 12/719,437, filed Dec. 9, 2010, 38 pages.

U.S. Office Action, U.S. Appl. No. 11/776,510, filed Dec. 10, 2010, 39 pages.

U.S. Office Action, U.S. Appl. No. 11/461,126, filed Dec. 23, 2010, 30 pages.

U.S. Office Action, U.S. Appl. No. 11/461,279, filed Jan. 7, 2011, 44 pages.

U.S. Office Action, U.S. Appl. No. 12/240,596, filed Jan. 21, 2011, 21 pages.
U.S. Office Action, U.S. Appl. No. 11/461,286, filed Jan. 21, 2011, 34 pages.
U.S. Office Action, U.S. Appl. No. 11/461,143, filed Feb. 4, 2011, 16 pages.
Japanese Office Action, Japanese Patent Application No. 200910138044.X, Jan. 26, 2011, 6 pages.
U.S. Notice of Allowance, U.S. Appl. No. 11/461,272, Feb. 23, 2011, 28 pages.
U.S. Office Action, U.S. Appl. No. 12/060,194, Feb. 25, 2011, 18 pages.
U.S. Office Action, U.S. Appl. No. 12/879,933, Mar. 2, 2011, 7 pages.
U.S. Office Action, U.S. Appl. No. 12/210,519, Mar. 14, 2011, 38 pages.
U.S. Notice of Allowance, U.S. Appl. No. 11/461,024, Mar. 16, 2011, 12 pages.
U.S. Office Action, U.S. Appl. No. 11/461,300, Mar. 18, 2011, 25 pages.
U.S. Office Action, U.S. Appl. No. 11/777,142, Mar. 18, 2011, 21 pages.
U.S. Office Action, U.S. Appl. No. 11/461,037, Mar. 30, 2011, 29 pages.
U.S. Office Action, U.S. Appl. No. 12/210,511, Apr. 4, 2011, 49 pages.
U.S. Office Action, U.S. Appl. No. 12/247,202, Apr. 6, 2011, 37 pages.
U.S. Office Action, U.S. Appl. No. 11/461,126, Apr. 12, 2011, 27 pages.
U.S. Office Action, U.S. Appl. No. 11/461,294, Apr. 12, 2011, 23 pages.
U.S. Office Action, U.S. Appl. No. 12/210,540, Apr. 15, 2011, 45 pages.
U.S. Office Action, U.S. Appl. No. 12/340,124, Apr. 15, 2011, 48 pages.

* cited by examiner

FIGURE 16

```
human behavior model
    task name = information browsing
    time function = (7 secs, 5 secs), (2 secs, 10 secs)
    transit motion function = linear dynamical system
    hover motion function = steady control points
p0 = (0, 0, 0, 0, 0, 0), p1 = (2, 3, 3, 0, 0, 0), p2 = (5, 7, 2, 20, 10, 10)
```

FIGURE 19A

```
human behavior model
    task name = point and click for insertion
    time function = Fitt's law, 5 secs.
    transit motion function = Kalman filter
    hover motion function = steady control points
    p0 = (-2, 3, 0, 0, 0, 0)  p1 = f("center upper left-most paragraph")
```

FIGURE 19B

```
human behavior model
    task name = augmented reality
    time function = (Accot's law, 6 secs.), (Fitt's law, 8 secs)
    transit motion function = Kalman filter
    hover motion function = zoom-in-out, (zoom-in-out/40%, rotate left/60%)

control points
    p0 = (-2, 3, 0, 0, 0, 0)  p1 = f("center upper left-most paragraph"),
        p2 = f("center lower right-most paragraph")
```

FIGURE 19C

SYNTHETIC IMAGE AND VIDEO GENERATION FROM GROUND TRUTH DATA

BACKGROUND

1. Field of Art

The present invention generally relates to the field of image and video generation, and more specifically, to image and video generation using ground truth data.

2. Description of the Related Art

Various models have been used for generating images of documents in view of image degradations. The appropriate model for document image degradations has been the subject of numerous papers (Y. Li, D. Lopresti, G. Nagy, and A. Tomkins, "Validation of Image Defect Models for Optical Character Recognition," *IEEE Trans. Pattern Anal. Mach. Intell.* 18, 2 (February 1996), pp. 99-108. Pavlidis proposed a model including horizontal and vertical scaling, rotation, sampling rate, and quantization threshold (T. Pavlidis, "Effects of Distortions on the Recognition Rate of a Structural OCR System", In *Pro. Conf. on Comp. Vision and Pattern Recog.*, pp. 303-309, Washington, D.C., 1983). Baird suggested a model where variable parameters include font size, spatial sampling rate, rotation, horizontal and vertical scaling, horizontal and vertical translation, pixel displacement, Gaussian point-spread function, pixel sensor sensitivity, and quantization threshold. (H. Baird, "Document Image Defect Models", In *Proc. Of IAPR Workshop on Syntactic and Structural Pattern Recognition*, pp. 38-46, Murray Hill, N.J., June 1990; and H. Baird, "The State of the Art of Document Image Degradation Modeling", In *Proc. of 4 th IAPR International Workshop on Document Analysis Systems*, Rio de Janeiro, Brazil, pp. 1-16, 2000.) Smith experimented with a model that varies the width of the point-spread function, and the binarization threshold (E. H. Barney Smith and T. Andersen, "Text Degradations and OCR Training," *International Conference on Document Analysis and Recognition* 2005, Seoul, Korea, August 2005.). Khoubyari and Hull simulated character defects by thickening character strokes and then randomly flipping some black pixels to white (Khoubyari, S. and J. J. Hull, "Keyword Location in Noisy Document Images", *Second Annual Symposium on Document Analysis and Information Retrieval*, Las Vegas, Nev., pp. 217-231, April, 1993.). Kanungo et. al. model the curl distortions that result from scanning bound documents Kanungo, T.; Haralick, R. M.; Phillips, I, "Global and Local Document Degradation Models", Document Analysis and Recognition, 1993., *Proceedings of the Second International Conference on Document Analysis and Recognition ICDAR-93*, Volume, Issue, 20-22 October 1993 Page(s):730-734). Zi also considers the effects of bleed-through from text and images underneath or on the reverse side of the document of interest (G. Zi, "Groundtruth Generation and Document Image Degradation," University of Maryland Language and Media Processing Laboratory Technical Report (LAMP-TR-121), 2005.).

These models deal with images on scanners or bi-level images. These models do not provide imaging of non-planar forms. Further, these models use large sets of data for imaging video. What is needed is a more generalized imaging system model.

SUMMARY

One embodiment of a disclosed system and method generates video. Object information is received. A path of motion of the object relative to a reference point is generated. A series of images and ground truth for a reference frame are generated from the object information and the generated path.

One embodiment of a disclosed system and method generates an image. Object information is received. Image data and ground truth may be generated using position, the image description, the camera characteristics, and image distortion parameters. A positional relationship between the document and a reference point is determined. An image of the document and ground truth are generated from the object information and the positional relationship and in response to the user specified environment of the document.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the detailed description and the appended claims, when taken in conjunction with the accompanying drawings, in which:

FIG. 16 is a diagram illustrating a virtual image generated by a general lighting model to replicate the effects of flash photography.

FIGS. 19A, 19B and 19C are diagrams illustrating three embodiments for human behavior models and associated control points.

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles described herein.

A method and system for image and video generation includes generating an image or series of images using ground truth data, and models for parameters of the camera, and the environment of the object being imaged. The modeling may include image degradation and images captured by a variety of image capturing devices including handheld devices. The method and system also allows for arbitrary placement of the image capturing devices and the document being imaged as well as isometric deformations of the source document and arbitrary lighting conditions. The method and system also models the following effects: focus blur, motion blur, histogram compression, sensor noise, intrinsic and extrinsic camera parameters, shadows, sensor resolution, vignetting, background clutter, document deformations, and specular, ambient, and diffuse lighting and material properties. In one embodiment, this is accomplished by using a general ray tracing model for the generation of the virtual image based on the position of the virtual camera and its intrinsic parameters.

Figure 1:
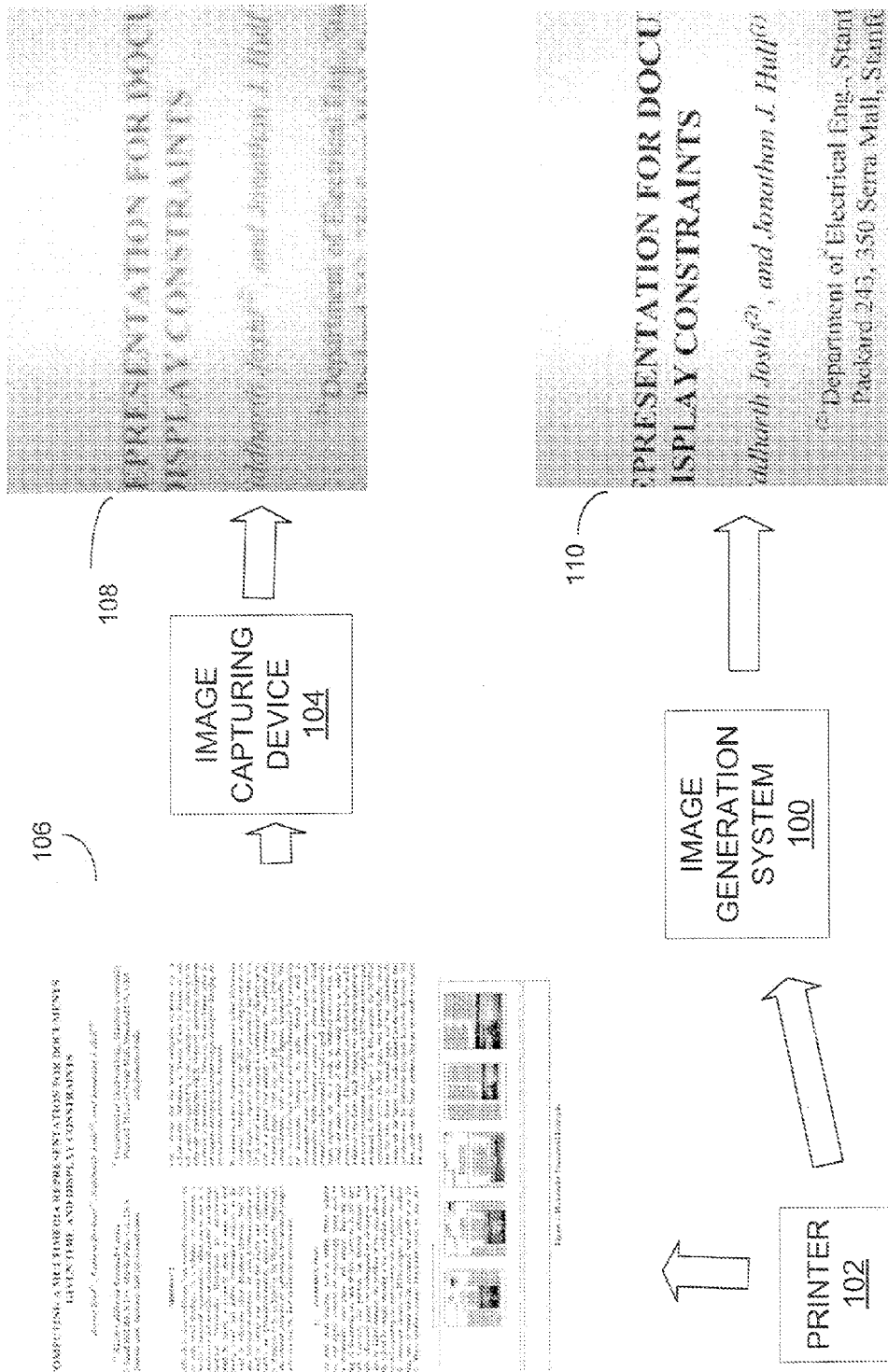
FIG. 1 is a diagram illustrating an image generation system according to the present invention.

FIG. 1 is a diagram illustrating an image generation system 100. A printer 102 generates a printed source document 106 and provides print information to the image generation system 100. An image capturing device 104 detects and captures the source document 106 and generates an image 108. The image capturing device 104 may be, for example, a handheld image capturing device, such as digital camera or a cell phone, or a fixed image capturing device, such as a web camera. By way of example, the image capturing device 104 will also be referred to as camera 104 in this application. The image generation system 100 generates a virtual image 110 in response to the print information from the printer 102. The print information (not shown) represents the source document 106, and may be data in a page description language, for example, Postscript® or PCL. Print information can also be a sequence of graphics device interpreter (GDI) commands that are converted to a raster image by the computer operating system (e.g., Windows XP). The print information may include ground truth data for each object in the source document. The virtual image 110 is a generated image of the print document 106 produced from the print information that includes ground truth data. In one embodiment, a page description language file is converted to a raster representation such as tiff, jpeg or bmp with an interpreter such as ghostscript. In one embodiment, the virtual image 110 is a single image. In another embodiment, the virtual image 110 is a sequence of images or frames, such as a video. In one embodiment, the virtual image 110 is representative of the image 108. The image generation system 100 generates the virtual image 110 using the print information, parameters of the camera 104, and environmental parameters of the source document 106.

The image generation system 100 may include a processor, such as a Pentium 4 or Xeon processor manufactured by Intel Corporation, and executes the image generation as software. The image generation system 100 may also be generated in whole or in part as software on the graphics processing unit (GPU) on the video card of a personal computer.

The image generation system 100 may be used to generate data for facial recognition or medical imaging systems.

Figure 2:
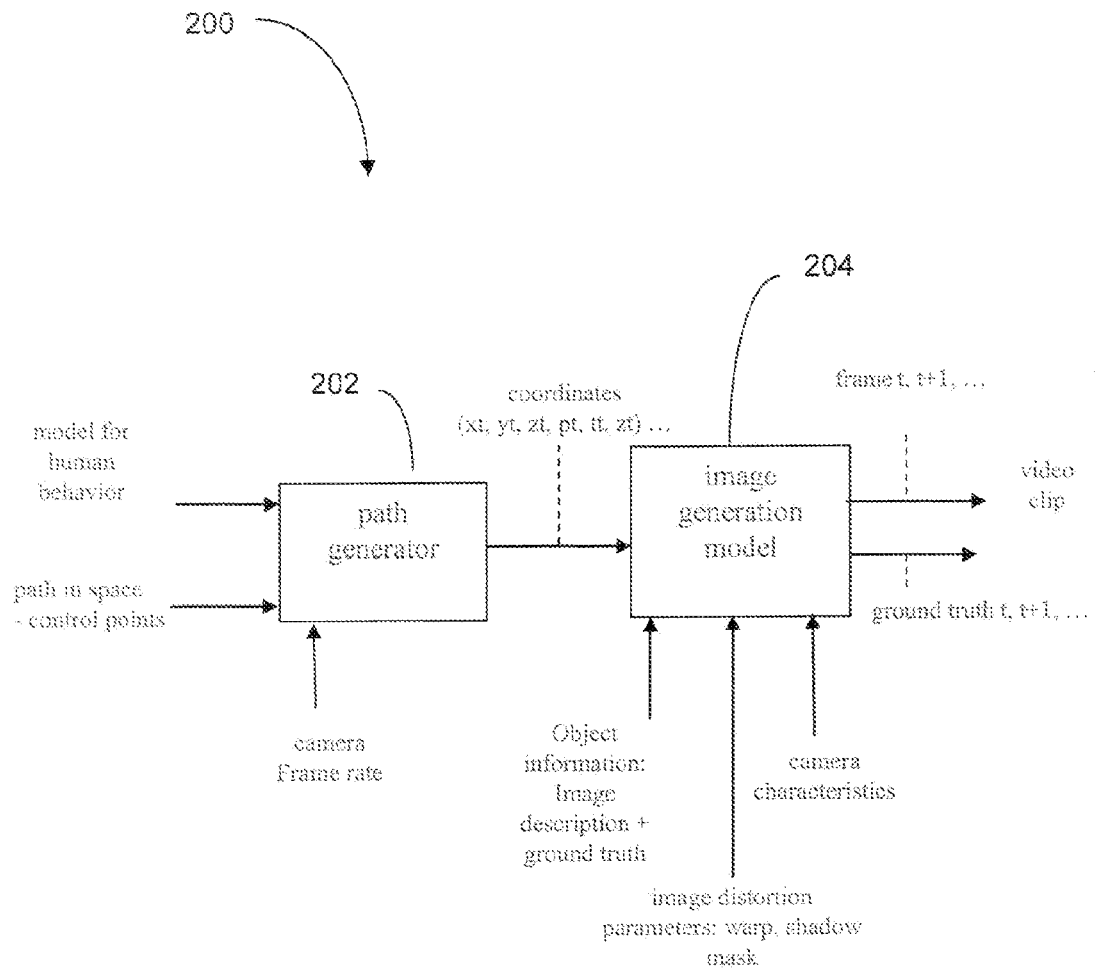
FIG. 2 is a block diagram illustrating one embodiment of the image generation system of FIG. 1.

FIG. 2 is a block diagram illustrating one embodiment of a video generator 200 which may be the image generator 100. The video generator 200 comprises a path generator 202 and an image generation model 204.

The path generator 202 generates a sequence of coordinates for the position of the camera 104 relative to a given image, such as the document 106. In one embodiment, the path generator 202 generates the sequences of coordinates (shown as coordinates xt, yt, zt, pt, tt, and zt) in response to a model of human behavior for movement of the camera 104, a path of the movement, and the frame rate of the camera 104. In one embodiment, the path of the movement is specified as a series of control points and the human model represents human behavior for moving the camera between the control points. The path of the movement of the camera 104 is user-specified to define the movement that a person makes with the camera, or may be received from the camera 104.

The image generation model 204 may use characteristics of the camera 104, image distortion parameters, and object information comprising image description and ground truth data from the printer 102 to produce a single image or a sequence of frames, one for each set of coordinates. The characteristics of the camera 104 and image distortion parameters may be user inputted. Each frame is distorted to account for a given warp and shadow of the source document 106. The received object information about the source document 106 includes information that allows the image to be generated. For a series of images, large sets of data representing motion are typically used. The image generation model 204 uses the object information representative of the image, which may be three-dimensional in instances such as facial recognition and medical imaging, to generate an image or video. In one embodiment, the object information includes a raster image (e.g., tiff, jpeg, bmp, etc.) of a document and the ground truth information specifying the identity and location of every character. (Note: location can be specified as the x-y of the upper left corner of the character and the number of columns and rows in the box that covers it.) In another embodiment, the object information is print information in a page description language (PDL) such as Postscript or PCL and part of the processing of the image generation model 204 is "rendering" an image of the document from the PDL using an interpreter such as Ghostscript. In another embodiment, the object information for a three-dimensional application such as facial recognition or medical imaging is provided as a virtual reality markup language (VRML) or Extensible 3D (X3D) file and part of the processing of the image generation model 204 is rendering three-dimensional views of the object using an interpreter such as OpenVRML, Xj3D or Flux. The image generation model 204 may generate ground truth data for the virtual image 110. In one embodiment, a mapping table is output that transforms any input x-y coordinates in the source document 106 to a corresponding output coordinates x'-y' in the virtual image 110. This allows for the transformation of the geometric position of any ground truth information, such as the positions of the bounding box data shown in the source document of FIG. 3, to their corresponding positions in the virtual image 110. A "reverse" mapping table may also be provided by the image generation model 204 that transforms any x'-y' coordinate in the virtual image 110 to the corresponding x-y position in the source document 106. The mapping table may take the form of a conventional array or hash table with an entry for every x-y or x'-y' that occurs in the source document or real image. In an alternative embodiment, a function may be provided that is given an x-y or x'-y' pair and computes the corresponding pair in the other image. Examples of mapping functions include a projective transformation as well as other well known geometric transformations. In some cases the mapping table may provide more than one output position. Furthermore, those positions may be associated with a likelihood value that indicates the amount of their image characteristics (e.g. intensity, color, etc.) that were contributed to the input position. Thus, the image generation model 204 may receive ground truth data for a single image, and generate the ground truth data for a series of frames of a video. This reduces the amount of ground truth data that is generated before generating the virtual image 110. In one embodiment, the image generation model 204 generates the virtual image 110 using parameters of the image capturing device 104, sensor noise, contrast degradation, shadow, vignetting, focus blur, motion blur, background, isometric surfaces, and general lighting. The image generation model 204 may include parameters of the image motion including warping, and shadows. The image generation model 204 may use machine learning to estimate the parameters.

Figure 3:
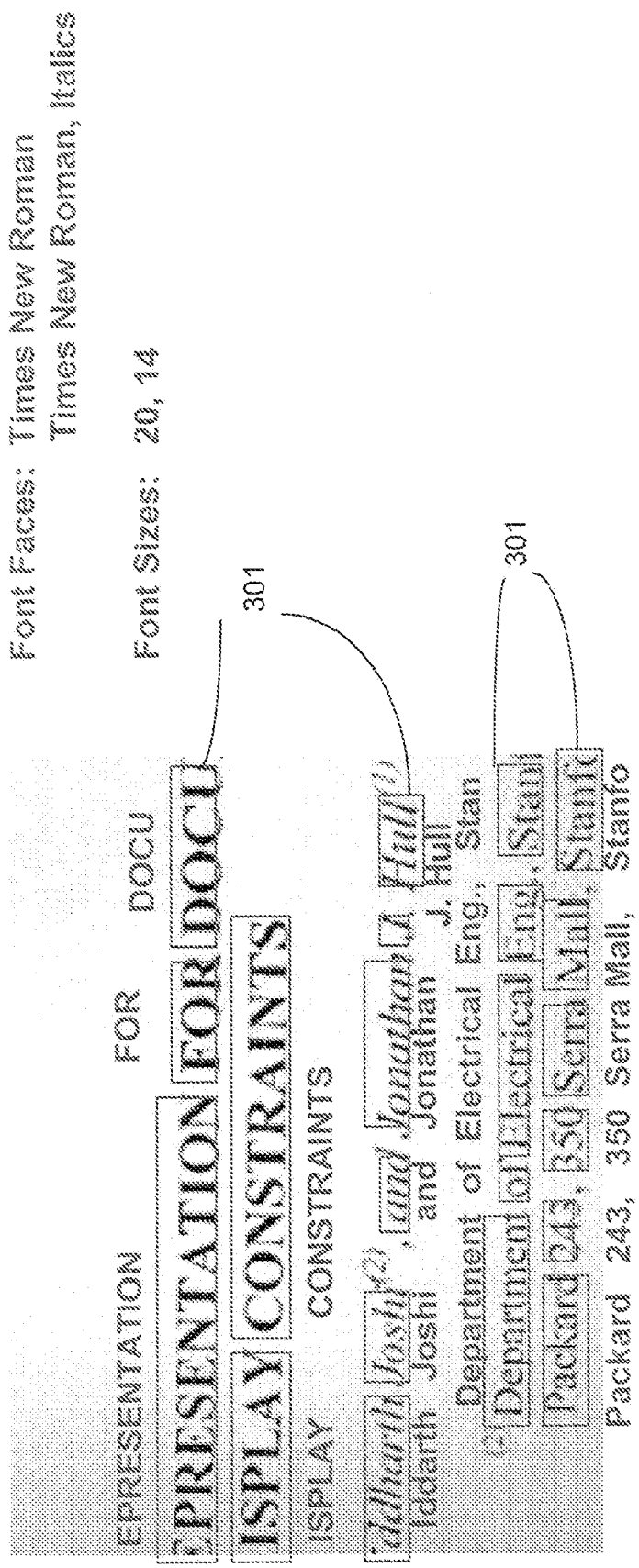
FIG. 3 is an image of a source document of FIG. 1 and marked regions indicating ground truth of the source document.

FIG. 3 is an image of a source document 106 and marked regions 301 that are represented by ground truth data. The ground truth of the marked regions 301 may include font faces, font sizes, and locations on the source document 106. The image generation model 204 receives the ground truth from the printer 102 or another source, or generates the ground truth from the print information. The ground truth may be processed as an overlay of the marked regions 301 on an image. The ground truth for an image can also include meta data about the source document and how it was generated such as the time, date and location where the corresponding paper version of the document was printed, an identification of the printer, the PC, and the person who printed the document. The ground truth can also include the location, path and name of the original source file (e.g., Word, PDF, and the like). This would be sufficient to locate the source file later.

Figure 4:
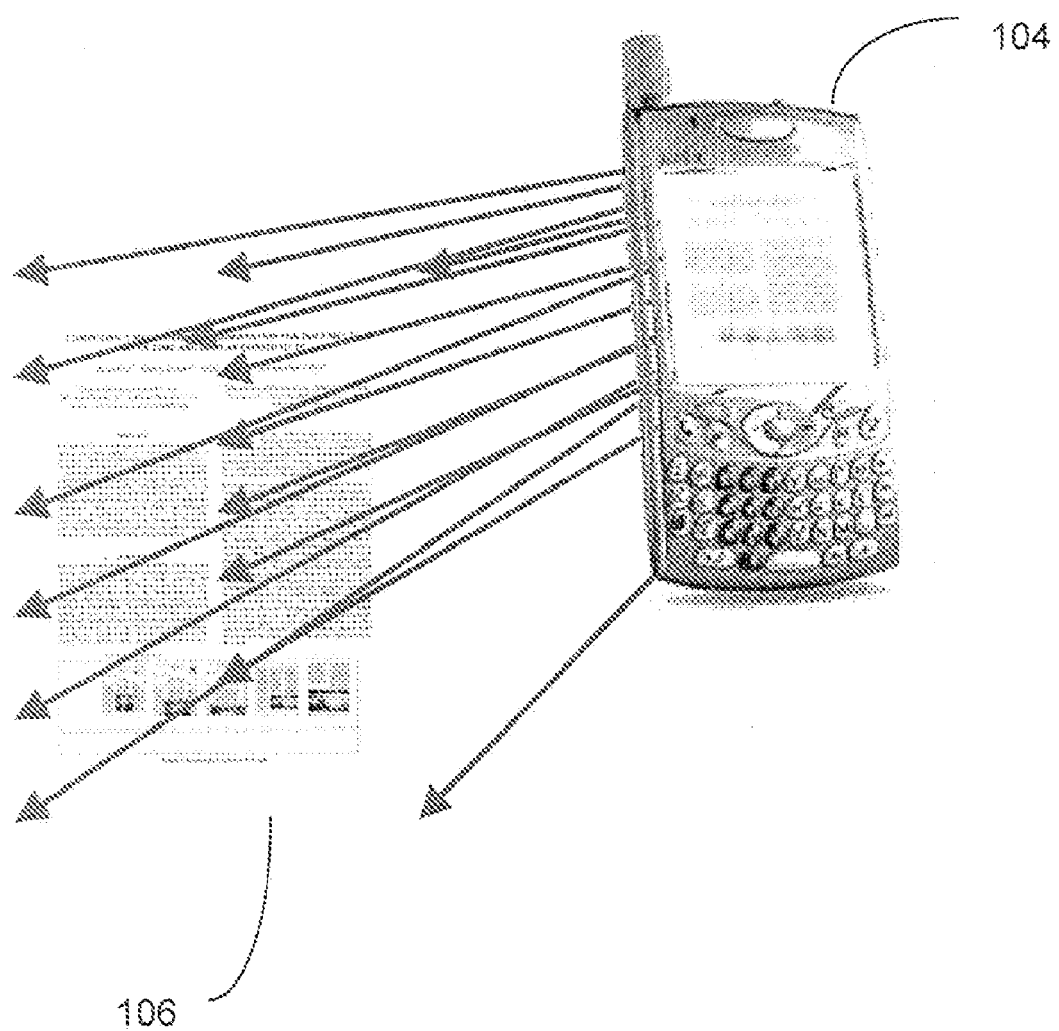
FIG. 4 is a pictorial diagram illustrating ray tracing from a source document to a camera.

FIG. 4 is a pictorial diagram illustrating ray tracing from a source document 106 to a camera 104. The image generation model 204 uses ray tracing to generate the virtual image 110 by tracing rays from portions of the source document 106 to the camera 104 using the extrinsic camera parameters as described below in conjunction with FIG. 5. Rays are traced from each portion of the document 106 to the camera 104 to generate an image of the document. As the camera 104 is moved according to the coordinates from the path generator 202, rays are traced from the document 106 to the camera 104.

Figure 5:
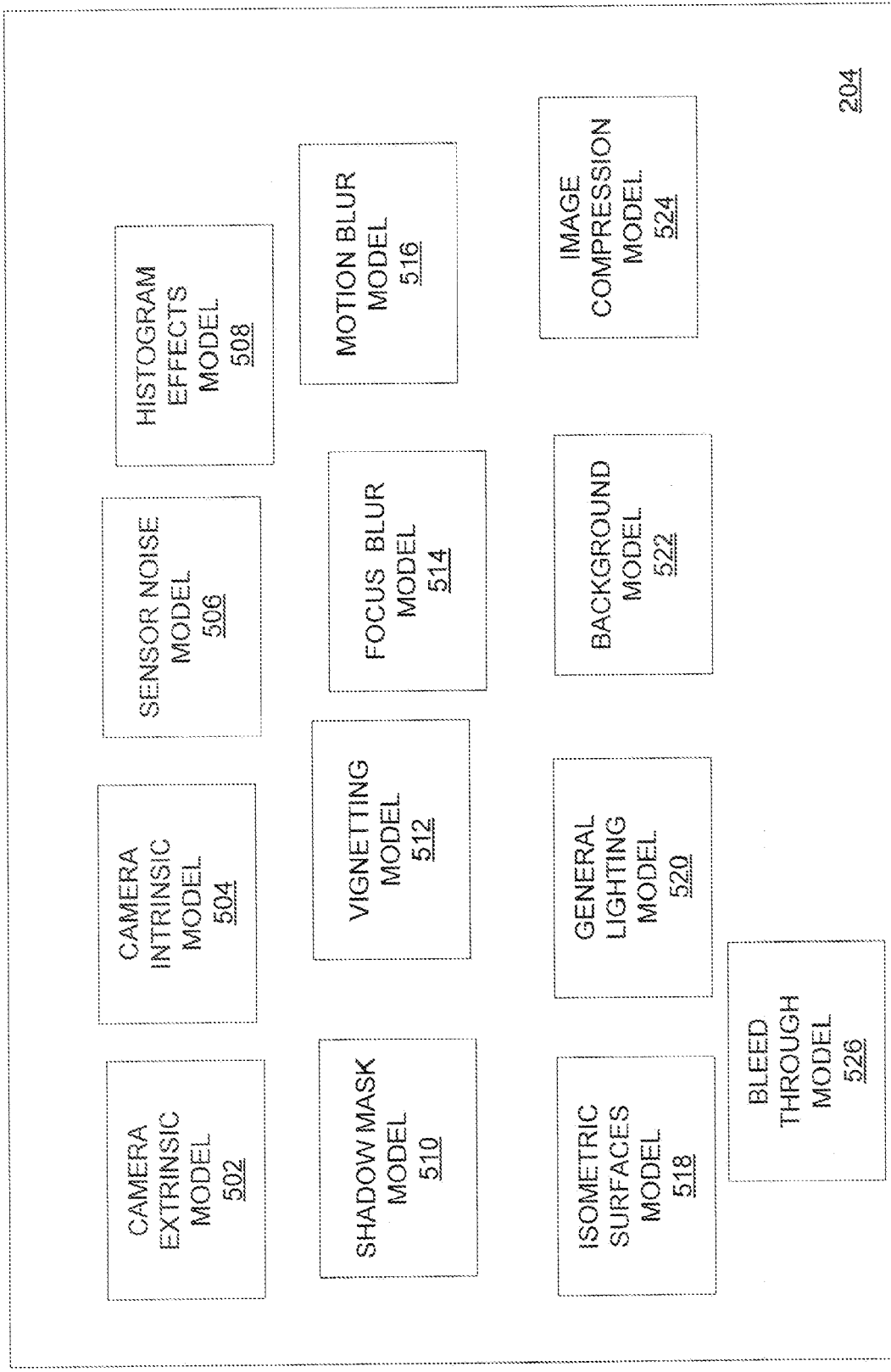
FIG. 5 is a block diagram illustrating the image generation model of the image generation system of FIG. 2.

FIG. 5 is a block diagram illustrating the image generation model 204, which comprises a camera extrinsic parameter model 502, a camera intrinsic model 504, and a plurality of effects models 506, 508, 510, 512, 514, 516, 518, 520, 522, 524 and 526. The effects models 506, 508, 510, 512, 514, 516, 518, 520, 522, 524 and 526 include a sensor noise model 506, a histogram effects model 508, a shadow mask model 510, a vignetting model 512, a focus blur model 514, a motion blur model 516, an isometric surfaces model 518, a general lighting model 520, a background model 522, an image compression model 524, and bleed through model 526. The image generation model 204 uses the camera extrinsic parameter model 502 for the ray tracing. The image generation model 204 uses the camera intrinsic parameter model 504 to simulate the effects on the image from the camera 104. The image generation model 204 uses the effects models 506, 508, 510, 512, 514, 516, 518, 520, 522, 524 and 526 to simulate photographic, lighting, and the environment on the image 106.

The extrinsic parameters of the camera 104 may include translation and orientation information of the camera 104 in relation to the image 106. In one embodiment, the position of the camera 104 is represented by the global X, Y, and Z values of the camera position (e.g., in inches) of the camera 104 relative to the source document 106 (the center of which is considered the origin). The orientation of the camera is represented by the three Euler angles, $\theta_x$, $\theta_y$, and $\theta_z$. In one embodiment, the image generation model 204 uses ray tracing to generate the image 110 using the extrinsic parameters of the extrinsic parameter model 502.

Figure 6:
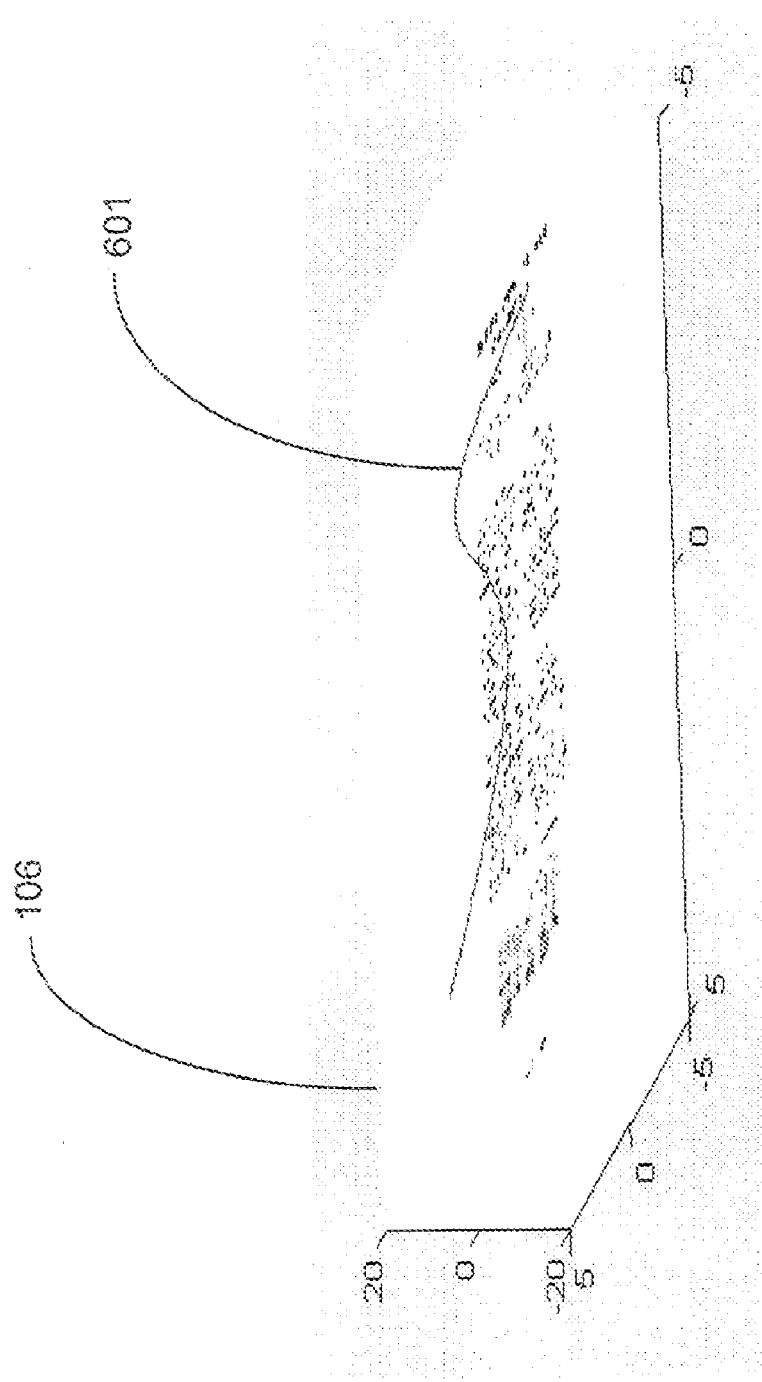
FIG. 6 is a three dimensional diagram illustrating an exemplary video trajectory over a source document.

FIG. 6 is a three-dimensional diagram illustrating an exemplary video trajectory 601 over a source document 106. The path generator 202 estimates the position of the camera 104 for a given source document 106 using a model for human behavior and an ordered set of control points. The path generator 202 computes the motion of the camera 104 along a trajectory between control points at the frame rate of the camera 104.

The model for human behavior specifies the name for a task being simulated, a mathematical time function that determines the amount of time for moving between control points and the time the camera 104 hovers at each point, a mathematical transit motion function that determines the path between control points, and a mathematical hover motion function that determines the movement of the camera 104 when it reaches each control point. The control points are provided as an ordered set of (x, y, z, thetax, thetay, thetaz) values. The names of simulated tasks include but are not limited to "information browsing," "point and click for insertion," "point and click for retrieval," "augmented reality interface," "mouse," "information browsing", and "gesture." Mathematical time functions include a set of user-specified constants for both motion time and hover time. Fitts law or Accot's law can be used to predict the time required to navigate between points. Mathematical transit motion functions are given an ordered set of control points, the total time for the motion between each pair of control points and a camera frame rate (typically specified as a sampling rate in frames per second). The transit motion functions calculate the position of the camera each time a frame is captured. Mathematical transit motion functions include user-specified constants such as a straight line or a manual specification for the position of the camera every time a frame is generated. In some cases, a null transit motion function is used and the system creates images only at the control points. The number of images would be determined by the hover time and the camera frame rate. A linear dynamical system is another example of a transit motion function. A Kalman filter is a transit motion function that can be trained from examples of human motion and can generate paths that simulate how humans move a camera between control points. Examples of other transit motion functions include an extended Kalman filter, a particle filter, an extended particle filter, a Bayesian filter, an extended Bayesian filter and other techniques well known in the art. Mathematical hover motion functions are given a starting position as a control point, the amount of time the camera hovers at that point, and a specification for the movement of the camera during that time. Examples of movement include a steady hover. Typically the camera 104 jitters nearby the control point to simulate a human hand. Other movements include zooming in and out. This simulates a user's attempts to focus the camera 104 by adjusting the distance to the source document 106. Another hover motion function is a rotation. The hover motion function can also be an arbitrary combination of the elementary motions mentioned as well as others. The hover motion function could be a manual specification for the position of the camera every time a frame is generated during the hover. The amount of hover time allocated to each motion can be uniform, user-specified, or it can be specified by another mathematical function.

FIGS. 19A, 19B and 19C are diagrams illustrating three embodiments for human behavior models and associated control points. In the example shown in FIG. 19A, a task named "information browing" is simulated. The time between control points is specified as a set of constants that determine both the time to navigate between points and the time to hover at each point. A linear dynamical system is used to determine the path between control points. The first control point p0 specifies the camera 104 is at rest—all coordinates are zero. The second control point p1 specifies that it's 2 inches to the right of the upper left corner of the document, 3 inches down from the upper left corner, 3 inches above the page and perpendicular to the document—all three Euler angles are zero. p1 specifies a change in x, y, z position and different Euler angles: thetax=20 degrees, thetay=10 degrees, and thetaz=10 degrees.

In the example shown in FIG. 19B, a task named "point and click for insertion" is simulated. The time between control points is determined by an application of Fitts law and the hover time is specified as a constant value (5 secs.). The motion function is determined by a Kalman filter. The control points are specified as a beginning point p0 at rest. The camera 104 is 2 inches to the left of the document and 3 inches down from the top. The second control point is automatically determined by a function that calculates the center of the upper left-most paragraph on a source document 106.

In the example shown in FIG. 19C, a task named "augmented reality" is simulated. Three control points are provided, the first p0 showing the camera at rest. The time to navigate from p0 to p1 is calculated by Accot's law. The camera hovers at p1 for 6 secs. The transit motion between p0 and p1 is determined by a Kalman filter and the camera 104 zooms in and out while hovering at p1. The time to move from p1 to p2 is determined by Fitt's law and the transit motion by a Kalman filter. While hovering at p2, the camera 104 zooms in and out for 40% of the hover time and rotates left for the remaining 60% of the hover time.

Figure 7:
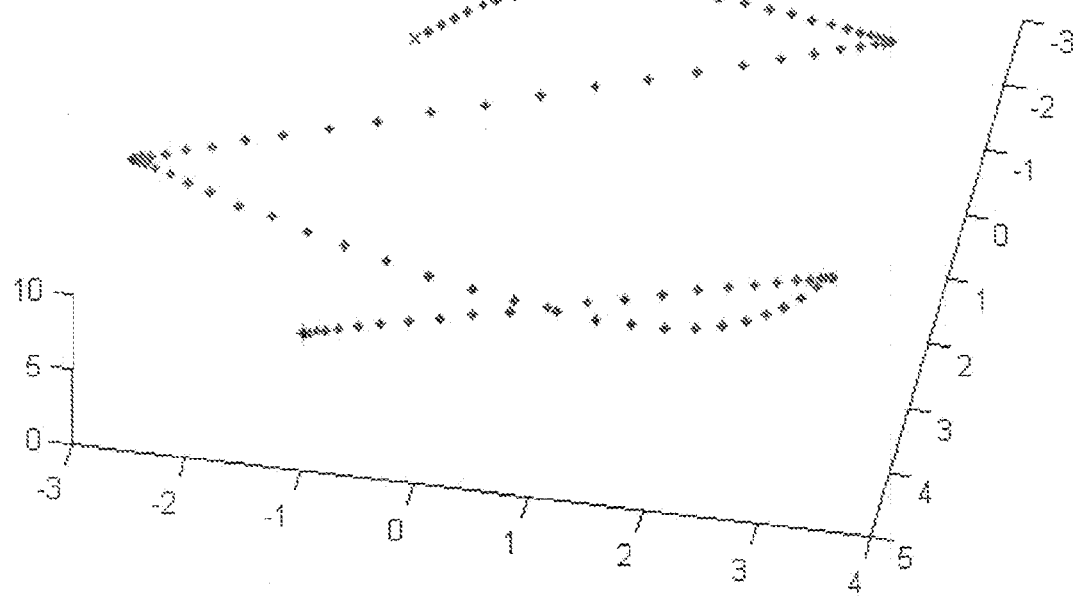
FIG. 7 is a three dimensional diagram illustrating an estimation of the trajectory of FIG. 6 using a minimum energy driving force.

The path generator 202 may use a discrete-time linear dynamical system as the transit motion function that determines the trajectory 601 between control points as a series of states including position, velocity, acceleration and jerk. In one embodiment, the path generator 202 includes noise. FIG. 7 is a three dimensional diagram illustrating an estimation of the trajectory 601 using a minimum energy driving force. In one embodiment, the position estimation may use feature matching techniques such as those employed by T. Sato, S. Ikeda, M. Kanbara, A. Iketani, N. Nakajima, N. Yokoya, and K. Yamada, "High-resolution Video Mosaicing for Documents and Photos by Estimating Camera Motion," *Proceedings of SPIE* 5299, 246 (2004), the subject matter of which is incorporated herein by reference, for video mosaicing for estimating ego-motion during video sequences. In one embodiment, general image registration such as the Fourier-Mellin transform may be used because of the presence of ground-truth data.

In one embodiment, the path generator 202 performs a minimum energy analysis as the transit motion function that determines the path between control points. The position and orientation of the camera 104 is represented by the three position parameters and three Euler angles. Each of these is updated using a discrete-time linear dynamical system. For example, the position of the camera 104, with respect to the origin of the source document 106 (in inches) is given by X. The state of the camera's X location at time n is given by:

$$X_n = [P[n] V[n] A[n] J[n]]'$$

where P[n] is the position of the camera 104 in the X direction, V[n] is the velocity, A[n] is the acceleration, and J[n] is the jerk. The state of the camera's X location at time n+1 is given by the following relation:

$$X_{n+1} = A^* X_n + B^* u(t)$$

where u(t) is known as the driving force and $$A = \begin{pmatrix} 1 & 1 & 0 & 0 \\ 0 & 1 & 1 & 0 \\ 0 & 0 & 1 & 1 \\ 0 & 0 & 0 & 1 \end{pmatrix} \text{ and } B = \begin{pmatrix} 0 \\ 0 \\ 0 \\ 0 \end{pmatrix}$$

From linear dynamical systems, if a state, $X_{des}$, is reachable in n steps, then the controllability matrix is:

$$C_n = [B \; AB \ldots A^{n-1} B]$$

Using the minimum energy solution for getting from a starting point to a desired state $X_{dex}$ in n steps provides:

$$u(t) = C_n^T (C_n C_n^T)^{-1} X_{dex}$$

Figure 8:
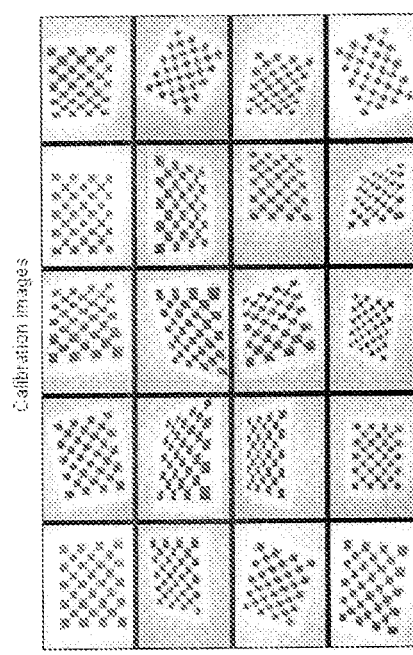
FIG. 8 is a picture illustrating a sample checkerboard calibration target of 20 images and the camera calibration toolbox.
Figure 8:
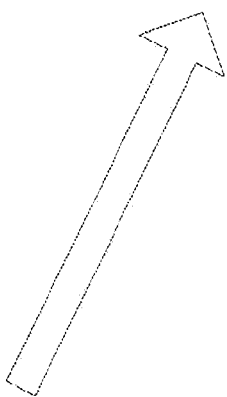
Figure 8:
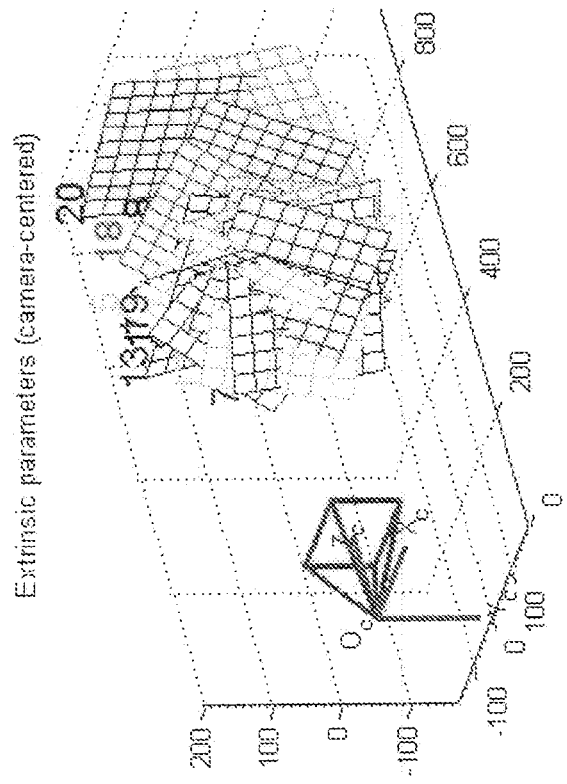

The image generation model 204 may also use a camera intrinsic model 504 to determine camera intrinsic parameters for generating the image 110. The image generation model 204 calculates ray tracing using the camera intrinsic parameters to determine where rays cast through each pixel of the sensor from the camera origin will intersect with the source document 106. In one embodiment, the intrinsic parameters of the camera are the two focal lengths, $f_x$ and $f_y$ (in pixels), principal point coordinates, $cc_x$ and $cc_y$ (in pixels), the skew coefficient, and five coefficients describing radial and tangential distortions. In another embodiment, the intrinsic parameters are analyzed using a model described in Z. Zhang, "A flexible new technique for camera calibration," *IEEE Transactions on Pattern Analysis and Machine Intelligence*, v. 22, no. 11, November 2000, 1330-1334, the contents of which are incorporated herein by reference. FIG. 8 is a picture illustrating a sample checkerboard calibration target of 20 images and the result of calibration. The calibration may account for focal lengths, optical center, skew, and radial and tangential distortions. Alternatively, a set of stock parameters for the type of camera 104 may be used.

The image generation model 204 may reduce aliasing in the final image by jittering the x, y locations of the traced rays in the image plane by half a pixel in both the x and the y directions, and then using the average value of the four resulting intersections of the ray with the page.

The image generation model 204 may include a sensor noise model 506 to generate the image. In one embodiment, the sensor noise model 506 is a sensor noise model comprising both signal dependent and signal independent noise, such as the virtual sensor design of Costantini, R. and Süsstrunk, S., "Virtual Sensor Design", Proceedings of the SPIE, Volume 5301, pp. 408-419 (2004), the contents of which are incorporated herein by reference. In another embodiment, the sensor noise model 506 includes only pixel gain non-uniformity. The sensor noise model 506 may include a uniform variable, with mean 1, and a range that can be adjusted to achieve a desired level of noise. The image generation model 204 multiplies the gain non-uniformity by the calculated intensity value for a pixel calculated via ray tracing.

Figure 9:
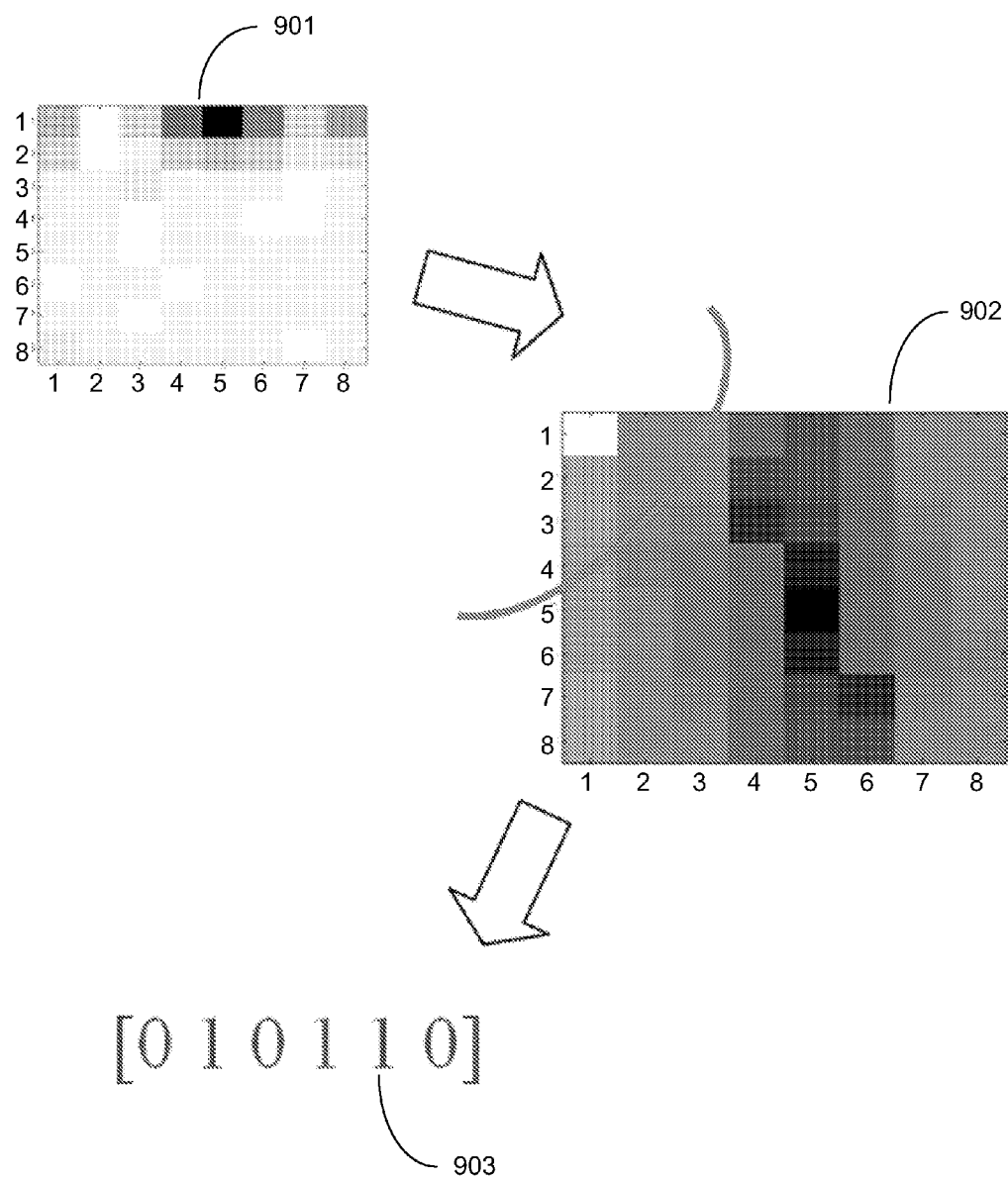
FIG. 9 is a diagram illustrating a sensor noise model.

FIG. 9 is a diagram illustrating an exemplary sensor noise model 506. The scale factor for the pixel gain non-uniformity can be estimated for a real image using a machine learning approach. In one embodiment, the sensor noise model includes a Downhill Simplex (Nelder-Mead) algorithm to maximize the similarity between the distribution of spatial frequencies in the virtual image, and the real image being matched. (see Kanungo, T. and Zheng, Q., "A Downhill Simplex Algorithm for Estimating Morphological Degradation Model Parameters," *University of Maryland Technical Report*, LAMP-RT-066, the contents of which are incorporated herein by reference.)

In one embodiment, the sensor noise model 506 uses a Neighborhood Frequency Distribution (NFD) which is defined as follows. For each 8×8 pixel block 901 in an image, the 2D Fast Fourier Transform (FFT) is calculated (shown as 902). Blocks may be discarded at this point if the DC coefficient of the FFT indicates that the block is mostly text or mostly background. Diagonal components of the upper-left-hand corner of the log of the magnitude of the 2D FFT are averaged. There are 6 frequency bands considered in total.

A six-bit feature vector 903 is then constructed where each bit indicates whether or not there was a significant component in each of the frequency bands. Significant in this case has been defined as larger than the average for a population of similar images (determined ahead of time).

The samples of this feature vector 903 for all of the 8×8 pixel blocks in an image can be compared with those from another image using the two-sample version of the Kolmogorov-Smironv test (KS test). As the cost-function input for the Downhill Simplex algorithm, the sensor noise model 506 uses the KS statistic that the KS test yields. It approaches zero as two populations come closer to satisfying the null hypothesis (that the two populations were in fact drawn from a single parent population). An advantage of using the Downhill Simplex algorithm is that it does not take derivatives of the objective function. Because the optimization function may not be convex, multiple random restarts of the algorithm with different initial simplex guesses may be done. In one embodiment, a pixel gain non-uniformity scale value on the order of 0.01 is where the algorithm converges.

The image generation model 204 includes a histogram effects model 508. In practice, the range of the histograms of images captured using a real sensor is smaller than the range of intensity values present in the scene. The histogram effects model 508 may model this effect either by mapping the histogram values of the virtual image to fall within the range of values appearing in some sample image taken with a real camera, or by a more complicated histogram matching which attempts to transform the histogram of the virtual image in such a way that its cumulative distribution of pixel values matches that of the example image by way of a look-up table transformation.

In one embodiment, the histogram effects model 508 includes a desired histogram having maximum and minimum values, and the histogram of the virtual image is adjusted to match the desired histogram. In another embodiment, the desired histogram is taken from a user-specified sample image.

Figure 10B:
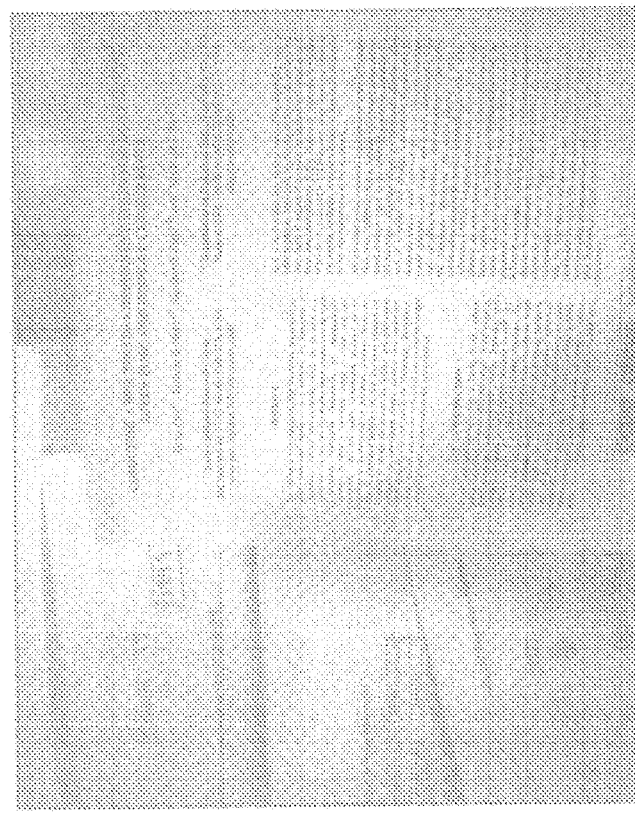
FIG. 10B is a diagram illustrating a virtual image having a shadow generated using the shadow mask of FIG. 10A.
Figure 10A:
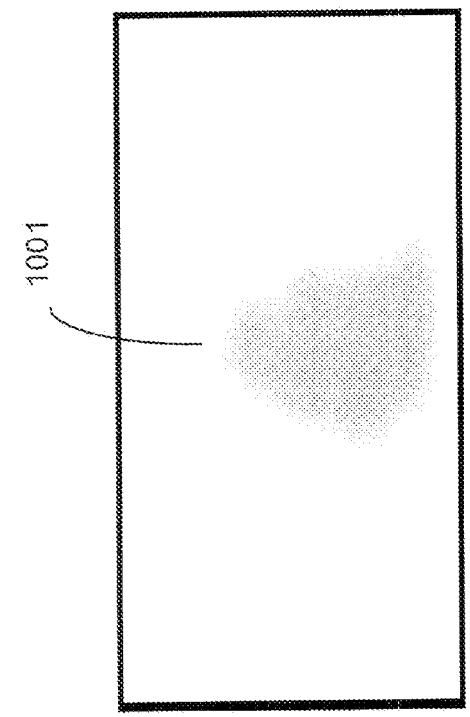
FIG. 10A is a diagram illustrating a shadow mask.

The image generation model 204 includes a shadow mask model 510 to generate shadows cast over document images. In order to model the large global shadows often cast over document images by the user's arm or the camera itself, a shadow mask is used. FIG. 10A is a diagram illustrating a shadow mask 1001. FIG. 10B is a diagram illustrating a virtual image having a shadow generated using the shadow mask 1001. The shadow mask 1001 is multiplied, element-wise, with the virtual image to produce the virtual image with a shadow.

Figure 11A:
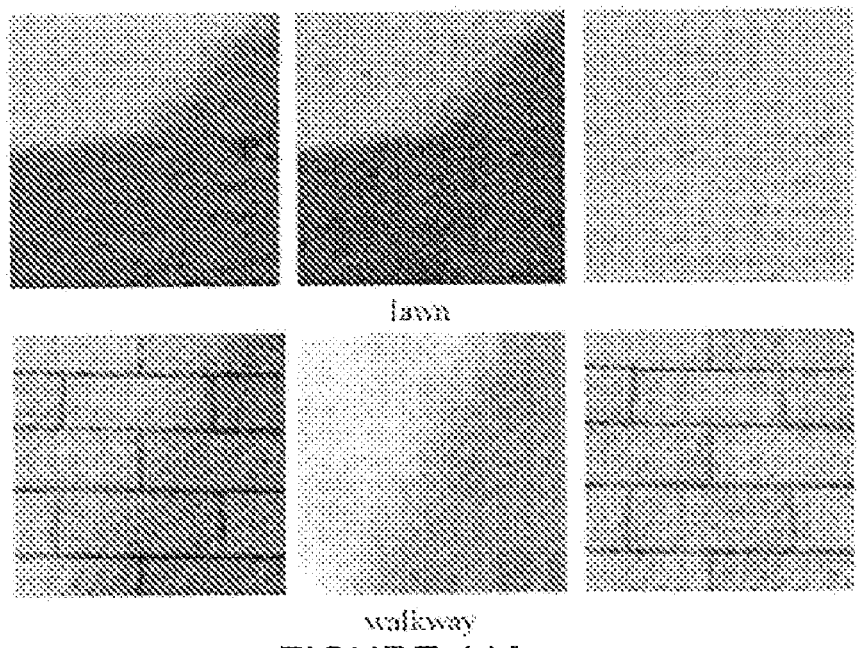
FIG. 11A is a diagram illustrating various shadows and the penumbra and umbra regions of an image.
Figure 11B:
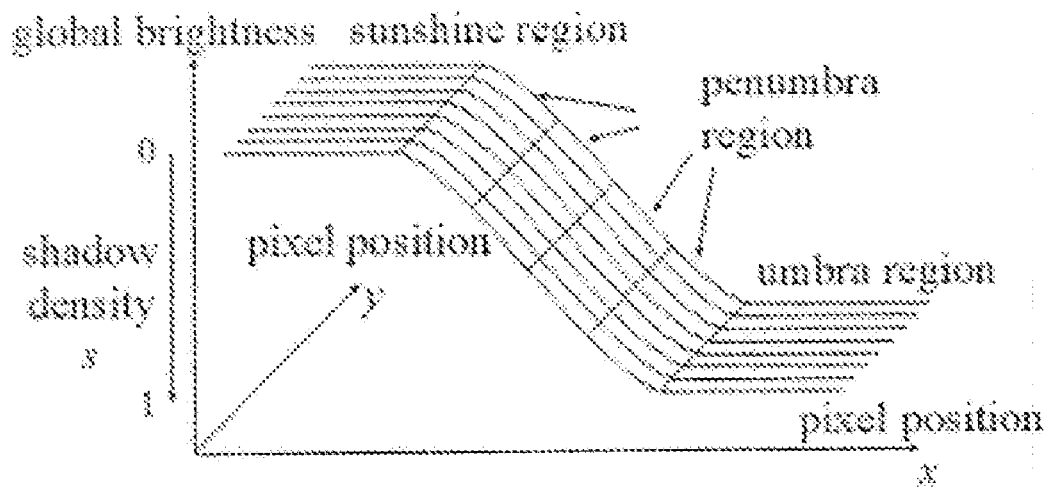
FIG. 11B is a three dimensional diagram illustrating brightness of the image with shadows, penumbra and umbra regions.

In one embodiment, the global shadow mask in the user-specified sample image is estimated using a technique suggested by M. Baba, M. Mukunoki, and N. Asada, "Shadow Removal from a Real Image Based on Shadow Density," Poster at SIGGRAPH2003, the contents of which are incorporated herein by reference. The sample image is first filtered using a maximum value filter, then a minimum value filter, and then a smoothing filter. The result is the global brightness of the image. In the virtual document image generator, this is used directly as the shadow mask, although further thresholding could be done to yield separate umbra and penumbra masks. FIG. 11A is a diagram illustrating various shadows and the penumbra and umbra regions of an image generated using the shadow mask model 510. FIG. 11B is a three dimensional diagram illustrating brightness of the image with shadows, penumbra and umbra regions. In an alternative embodiment, a number of shadow masks are pre-calculated for a given set of camera positions (X, Y, Z, thetax, thetay, thetaz). The shadow mask model 510 is modified to choose the shadow mask whose position is closest to the position of the camera. The decision about closeness can be made with a Euclidean distance measure or other commonly used distance measures (e.g., city block distance, etc.). In another alternative embodiment, the shadow mask is generated dynamically given the position of the camera, the general lighting model, and a model for the objects that may cast shadows. The shadow mask model 510 is modified so that it provides the camera position to the dynamic shadow generation algorithm and multiplies the shadow it calculates element-wise with the virtual image to produce a virtual image with a shadow.

Figure 12:
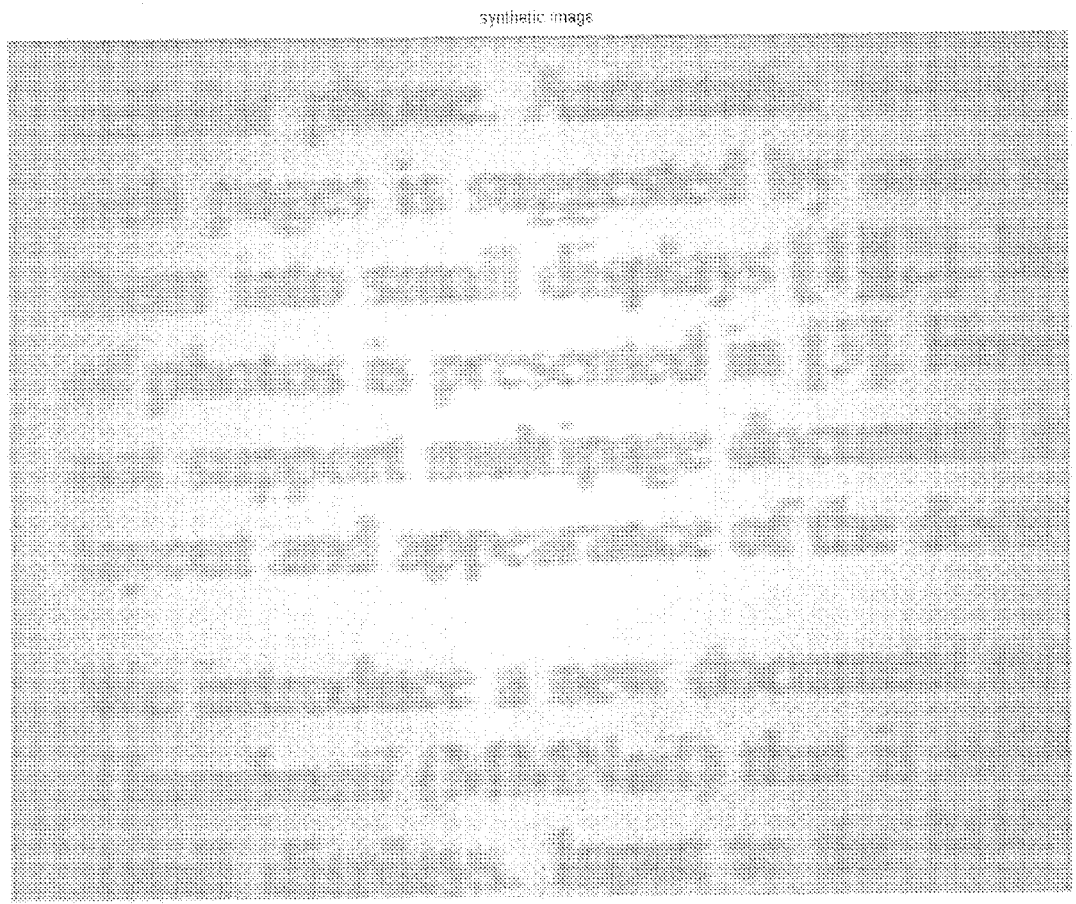
FIG. 12 is a diagram illustrating an image with vignetting.

The image generation model 204 includes a vignetting model 512. The vignetting model 512 includes in the image a vignetting-like effect to capture the "cosine-fourth" falloff in brightness as the angle between the ray corresponding to an image pixel and the optical axis of the camera increases by multiplying a pixel's value by the cosine of that angle raised to the fourth power. Vignetting in real images is the result of distant off-axis light rays not reaching the physical aperture due to obstruction by lens elements. The vignetting model 512 may be, for example, the vignetting model described in Aggarwal, M., Hua, H., and Ahuja, N., "On Cosine-fourth and Vignetting Effects in Real Lenses", *Int. Conf. on Computer Vision (ICCV) Proceedings*, Volume 1, Vancouver, Canada, Jul. 9-12, 2001 Page(s):472-479, the contents of which are incorporated herein by reference. FIG. 12 is a diagram illustrating an image with vignetting. In one embodiment, vignetting effects are also well captured by the shadow mask estimation procedure, so the cosine-fourth effect can be disabled.

Figure 13A:
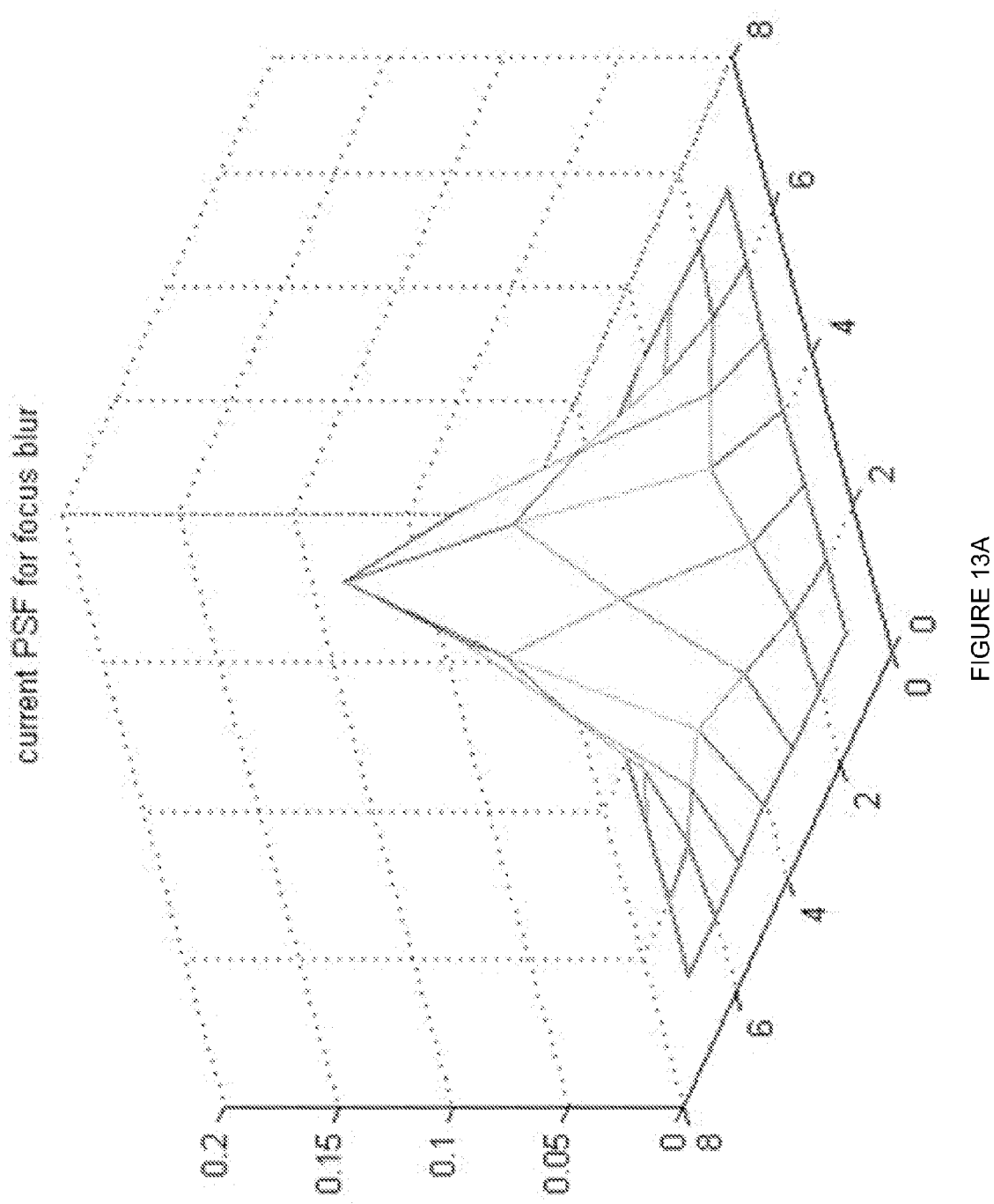
FIG. 13A is a three-dimensional diagram illustrating a Gaussian PSF of a focus blur model.
Figure 13B:
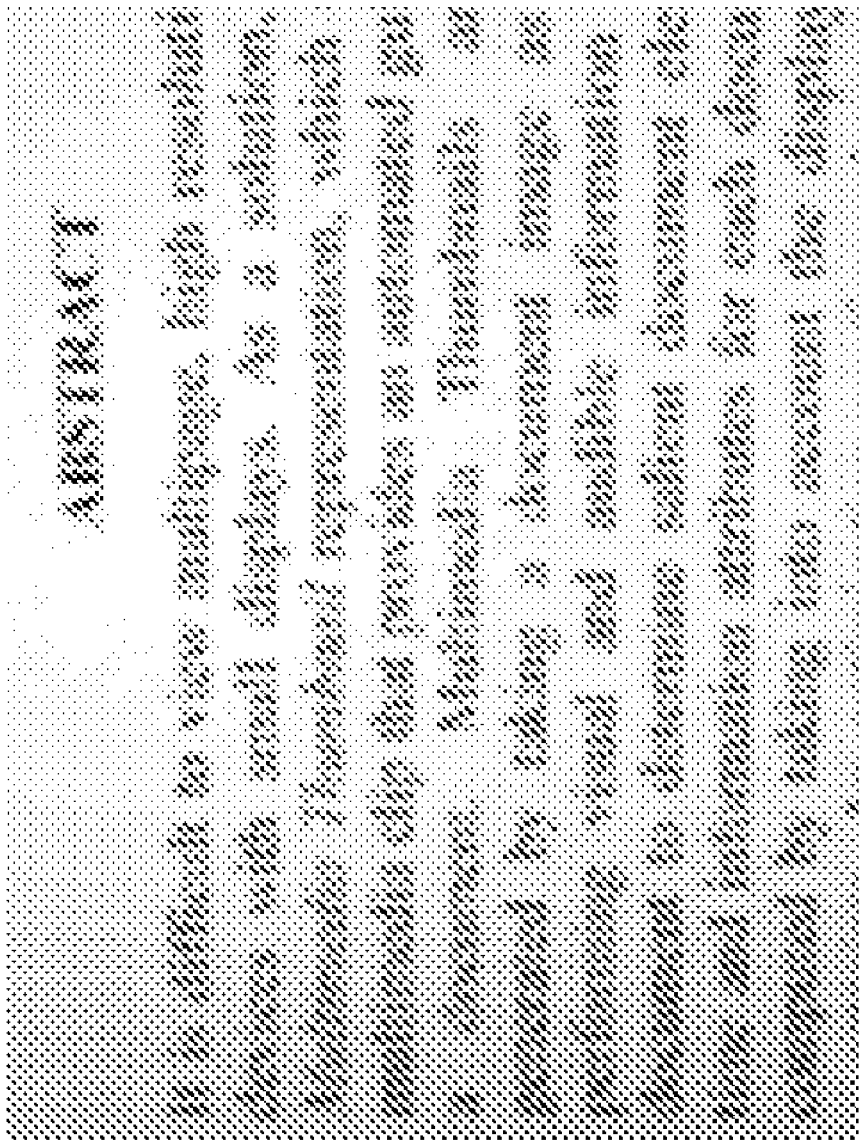
FIG. 13B is a diagram illustrating an image formed using the focus blur model.

The image generation model 204 includes a focus blur model 514 to account for blur created by the camera 104 not being focused using the coordinates from the path generator 202 and the camera intrinsic parameters. In one embodiment, the focus blur model 514 includes a single Gaussian point spread function (PSF) having a standard deviation that is calculated as the absolute value of the difference between the distance to the page along the optical axis of the camera 104 and the distance at which the camera has empirically been determined to be "in focus" (both in inches). The focus blur model 514 then scales the standard deviation by a focus blur scale parameter, which may be user-specified, to control the magnitude of the focus blur. The blur therefore increases and decreases linearly as the camera is moved. FIG. 13A is a three-dimensional diagram illustrating a Gaussian PSF of a focus blur model. FIG. 13B is a diagram illustrating an image formed using the focus blur model 514.

The focus blur scale parameter may also be estimated using the Neighborhood Frequency Distributions and a Downhill Simplex algorithm, which are described above in conjunction with the sensor noise parameter. The Downhill Simplex algorithm can optimize multiple parameters simultaneously. In one embodiment, the focus blur scale factors are the range of about 0.3 to about 0.5.

The image generation model 204 includes a motion blur model 516 for modeling blur of the image caused by motion of the camera 104 relative to the image 106. In one embodiment, the motion blur model 516 includes a global blur model that models a blur for all portions of the image using a common blur. This model does not include actual parameters of the camera such as exposure time, and does not include distance differences between pixels and the image. The latter does not account for some sensor pixels being close to the paper than others, and thus may have less motion blur. In this embodiment, the global blur is an artificial, but perceptually believable motion blur that is achieved by replacing each pixel of the final image by the average of the pixel values along a path whose direction and magnitude are determined by blur parameters blur_dx and blur_dy, which represent the amount of blur in two orthogonal directions, such as x and y, that would occur if the camera 104 has been moved during the exposure time, and may be user selected.

Figure 14:
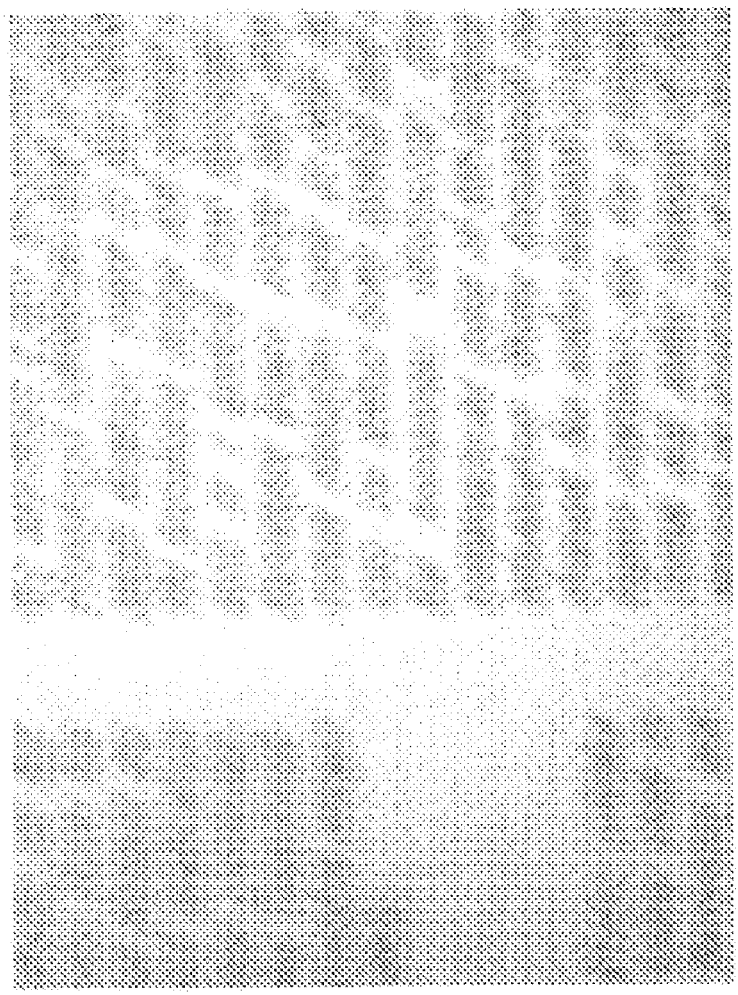
FIG. 14 is a diagram of an illustrative example of a video frame blurred using the motion blur model.

In another embodiment, the motion blur model 516 generates a plurality of intermediate images for corresponding different camera positions and combines the images into one image to represent the blur. The image is re-rendered k times with fractional position changes corresponding to the desired exposure time and camera velocity. As an illustrative example, the motion blur model 516 sets both the blur_dx and blur_dy blur parameters set to zero, and generates a blur for the virtual image by calculating at a set number, k, of equally-spaced, intermediate positions that the camera 104 would occupy if it were moving with a certain velocity and had a given exposure time. The final image is the average of these k intermediate images. This embodiment may provide a tradeoff between the smoothness of the final image that increases with larger k, and the time it takes to render a set of images, which will increase linearly with k. FIG. 14 is a diagram of an illustrative example of a video frame blurred using the motion blur model 516, with k=3.

Figure 15A:
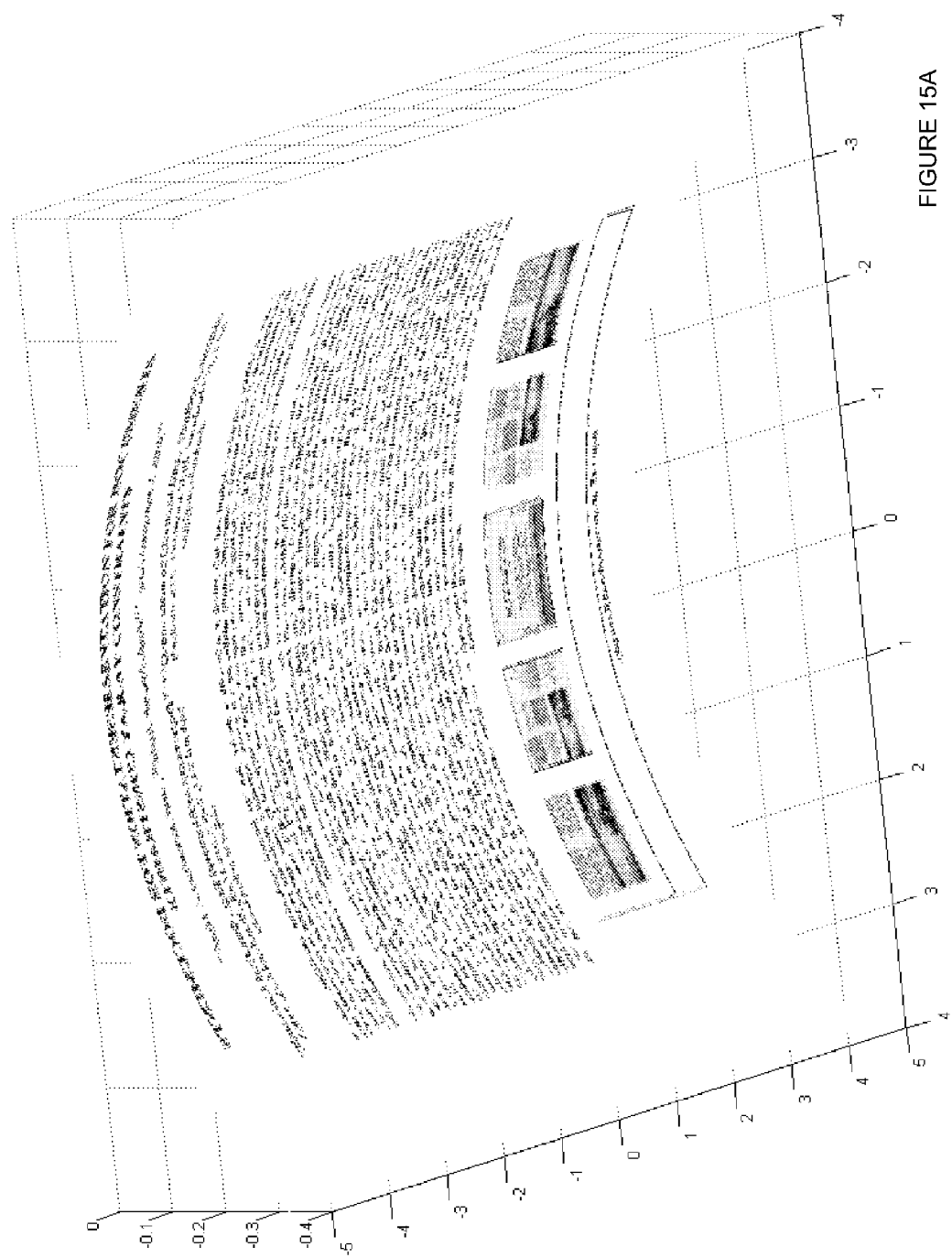
FIGS. 15A and 15B are three-dimensional diagrams illustrating quadratic and cubic families, respectively, of curves in one direction of an image.
Figure 15B:
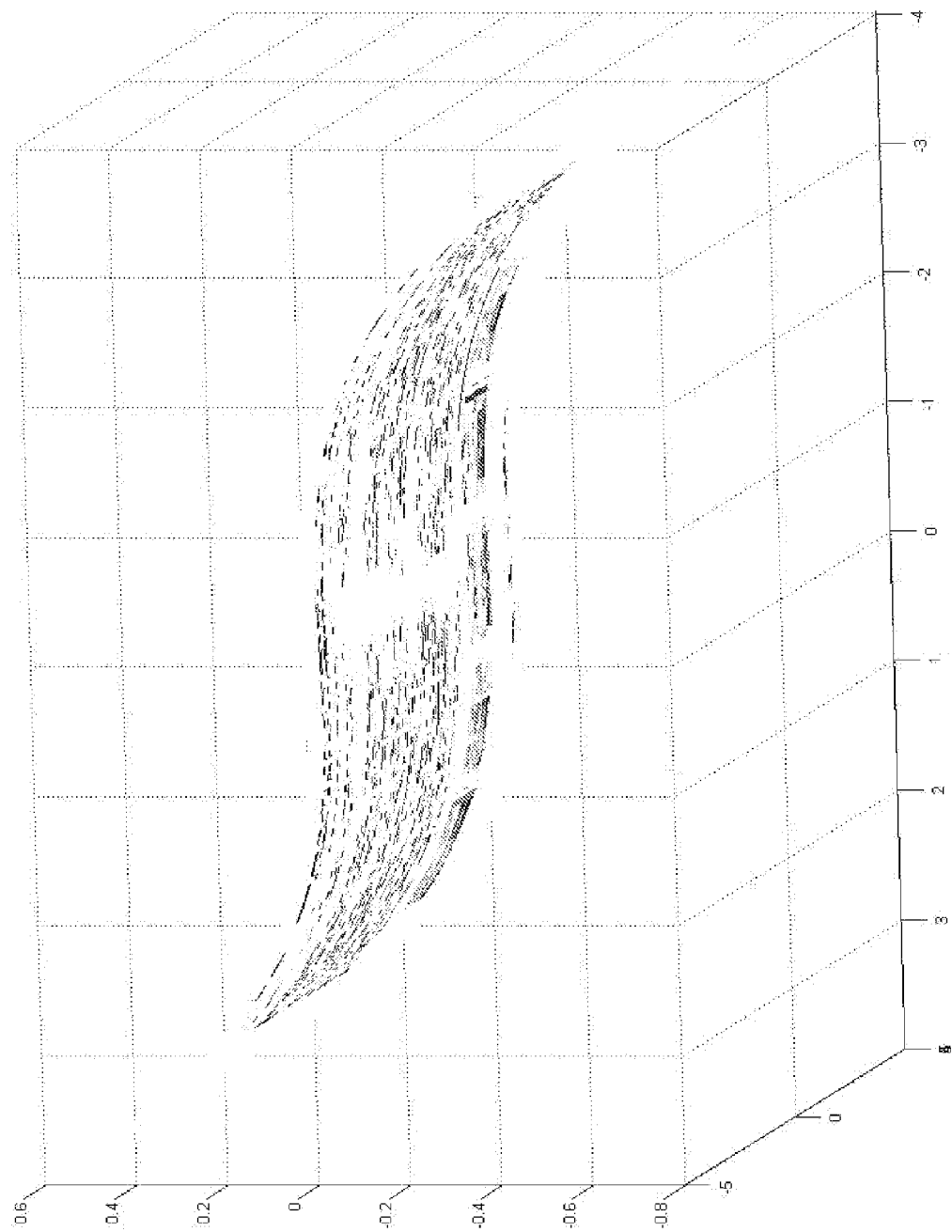

The image generation model 204 includes an isometric surfaces model 518 to generate images having developable surfaces, caused by, for example, warping or curling of folded papers or bound volumes. A developable surface may be, for example, a surface that "can be unrolled onto a plane without tearing or stretching." (J. Liang, D. DeMenthon, and D. Doermann, "Flattening Curved Documents in Images," In *Proc. Of the IEEE Conf. on Computer Vision and Pattern Recognition (CVPR)*, 2005, the contents of which are incorporated herein.) These are isometric mappings because distances along the surface of the document remain the same. When the source document is modeled as being warped in this way, the ray-plane intersection calculation becomes the more general ray-function intersection. FIGS. 15A and 15B are three-dimensional diagrams illustrating quadratic and cubic families, respectively, of curves in one direction of an image.

Figure 16:
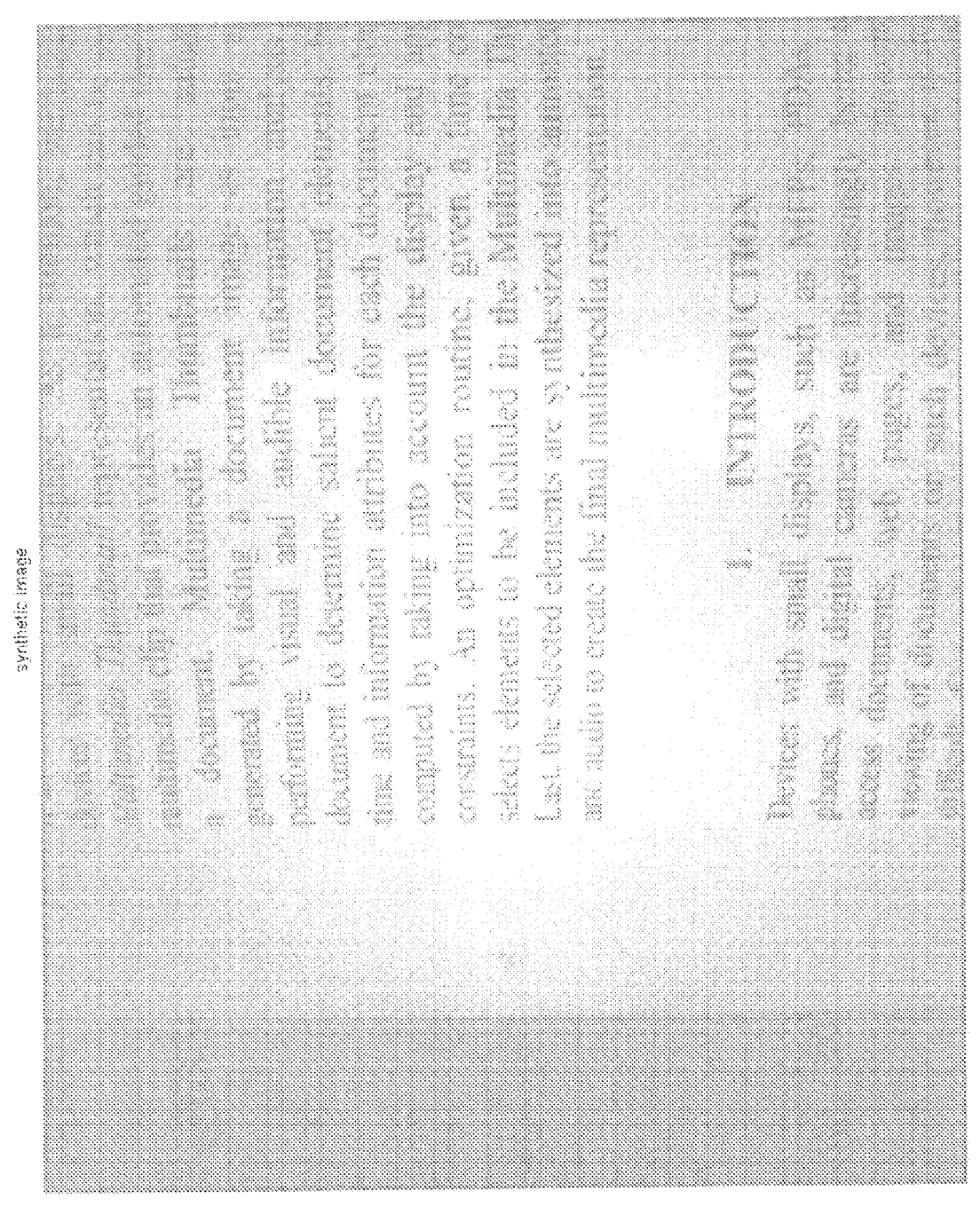

The image generation model 204 includes a general lighting model 520 to model the effects of material and illuminant properties. The effects may include ambient, diffuse, and specular components, such as described by T. Akenine-Moller and E. Haines., "Real-Time Rendering", A. K. Peters, Natick, Mass. $2^{nd}$ Edition (2002), pp. 70-84, the subject matter of which is incorporated herein by reference. The effects may be calculated during ray tracing. The ambient component of the total lighting intensity is the product of the paper's ambient constant, and the light source's ambient constant. (For example, if a source shed no ambient light, its ambient constant would be zero). The diffuse component is the product of the diffuse constants of the paper and the light source multiplied by the dot product of the vector from the point of interest on the paper to the light source and the normal vector at that point. Finally, the specular component is the product of the specular constants of the paper and light source and the dot product of the normalized half vector between the lighting vector and the normal vector and the normal vector, raised to the power of a shininess component. When the ambient, diffuse, and specular components are added, the total intensity value is used to modulate the amplitude of the corresponding pixel in the virtual image. FIG. 16 is a diagram illustrating a virtual image generated by a general lighting model to replicate the effects of flash photography. In a first embodiment, the paper's (or generally an object's) and a light source's ambient, diffuse and specular constants as well as the number of position of the light sources are fixed. In an alternative embodiment, the position of the light source can change as a function of elapsed time, frame number, or arbitrary user setting. In another alternative embodiment, the ambient, diffuse, and specular constants can also change dynamically as a function of elapsed time, frame number, or arbitrary user setting. This can simulate a change in the physical composition of the object such as its natural aging, or in a paper document, its fading in the presence of intense light or some other force such as heat. This could simulate the fading of a thermal paper document.

Figure 17:
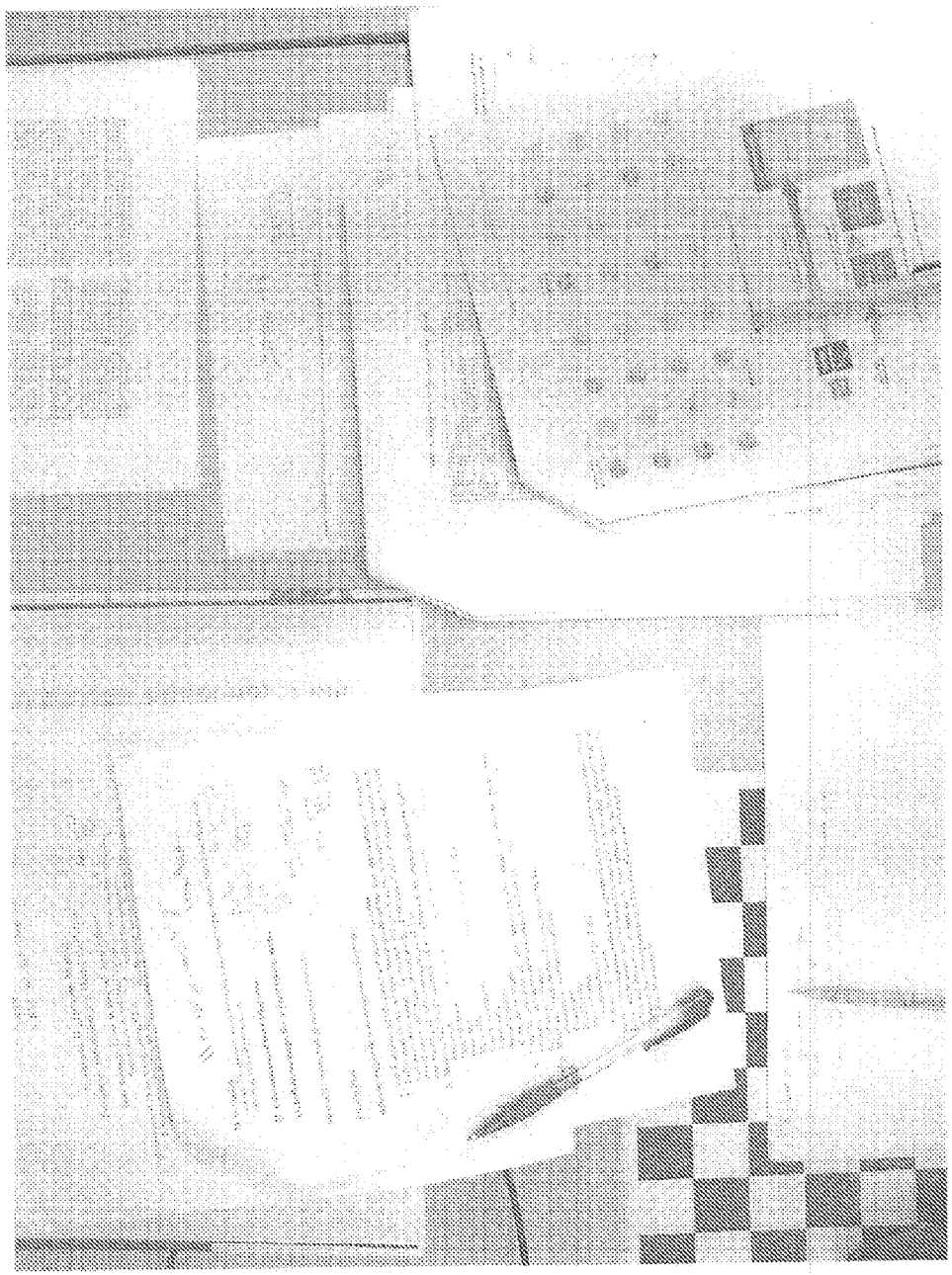
FIG. 17 illustrates an exemplary background image.

The image generation model 204 includes a background model 522 to mimic the effect of background clutter. The user may specify a background image to be displayed in areas of the image that are outside the bounds of the source document 106. FIG. 17 illustrates an exemplary background image. Background clutter provides extra information in a test or training image, and thereby causes problems in applications, such as optical character recognition. The background model mimics background clutter by using high-resolution images of desktop scenes as backgrounds for ray tracing to provide pixel values when traced rays intersected the plane of the paper outside the margins of the document. In one embodiment, the images have a small depth of field, with the scene plane being parallel to the image plane of the camera. A single fixed background image may be used. In an alternative embodiment, several background images are provided and the background model probabilistically chooses one of them using a random number generator. For example, one image might be used 60 percent of the time, another 30 percent of the time and another in ten percent of all frames. In yet another alternative embodiment, the background image could be provided as a video clip and the particular frame used as background would be determined by the time elapsed from the first generated frame, the number of frames previously generated, or by a user setting. The particular frame used as background could be ray traced as before if the background is co-planar with the source document as it would be if the source document was shown on a video display and the background changed dynamically. In an alternative embodiment, the particular frame used as background could be ray traced but under different settings for its distance from the camera than the source document and given the position of the camera (X, Y, Z, thetax, thetay, thetaz). In an alternative embodiment, a three-dimensional model for a background is used that can be ray-traced to generate the background image.

The image generation model 204 includes an image compression model 524 to model the image compression of the camera 104. The image compression may be, for example, still image compression or video compression. The image generation model 204 generates the virtual image in various image formats with varying levels of compression.

The image generation model 204 may include a model 526 for page bleed-through. Bleed-through often occurs with scanned document images. In one embodiment, the page bleed-through model includes combining a second document image (which may be rotated about the longitudinal axis for book bleed-through) with a first document image. When a ray intersects the source document the following heuristic may be used. If the ray intersects at a text pixel (dark), the sensor pixel value is set to that value. If the ray intersects at a non-text pixel (light), however, the sensor pixel value is set to $A*\alpha+B*(1-\alpha)$ where A is the source document's value at that pixel, B is the reverse-side document's value at that pixel, and $\alpha$ is the blending value (e.g., 0.85 might be an appropriate value for realistic, visible bleed-through).

Figure 18:
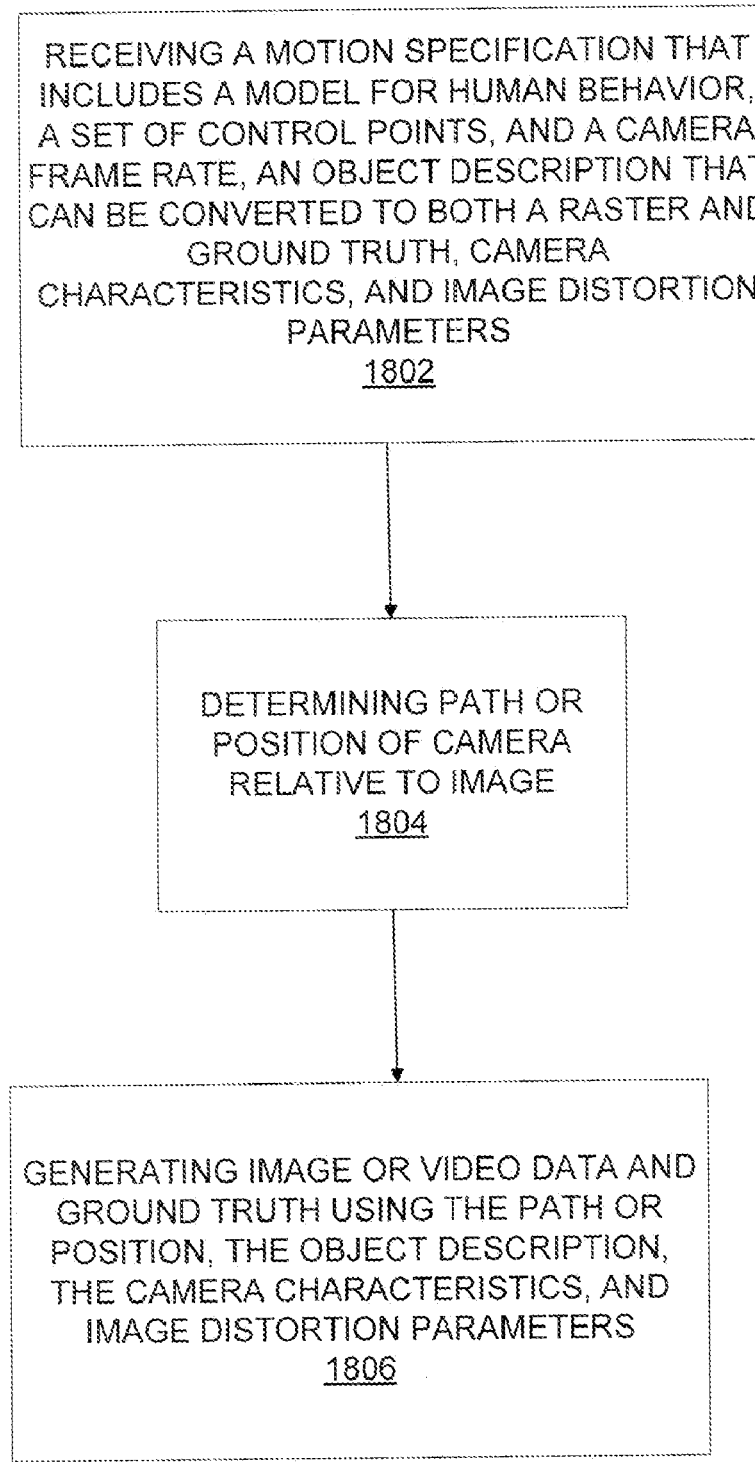
FIG. 18 is a flowchart illustrating the operation of the image generation system of FIG. 1.

FIG. 18 is a flowchart illustrating the operation of the image generation system 100. The image generation system 100 receives 1802 a motion specification that includes a model for human behavior, a set of control points, and a camera frame rate, object information that can be converted to both a raster and ground truth, camera characteristics, and image distortion parameters. The path generator 202 generates 1804 a path of motion of the object relative to a reference point, or generates a position of the object relative to the reference point. The image generation model 204 generates 1806 a series of images or an image for the reference frame from the ground truth and the generated path. The image generation model 204 may also generate image or video data, including ground truth information, using the path or position, the object information, the camera characteristics, and image distortion parameters.

In one embodiment, the image generation system 100 may generate an image or a video of a person from object information, which is then compared to an actual image or video of one or more persons for facial recognition. In another embodiment, an image or video of a portion of a person is generated for comparison to medical imaging and for diagnosis.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating synthetic images or video using ground truth through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method for generating video, the method comprising:
receiving, from an image capturing device, a plurality of captured images of an object, the captured images including object information representative of the object;
generating a path of motion of the image capturing device relative to the object;
generating a plurality of simulated effects on each of the captured images; and
generating a series of virtual images of the object and ground truth data for each virtual image from the object information, the plurality of simulated effects and the path of motion.

2. The method of claim 1 wherein generating the path of motion includes:
generating a sequence of coordinates in response to a model of human behavior for movement of the image capture device.

3. The method of claim 1 wherein the image capturing device is a handheld imaging device.

4. The method of claim 1 wherein generating the series of virtual images of the object includes:

generating the series of virtual images of the object based on a location and an orientation of the image capturing device relative to the object.

5. The method of claim 1 wherein the plurality of simulated effects includes a characteristic of the image capturing device.

6. The method of claim 5 wherein the characteristic of the image capturing device includes histogram effects.

7. The method of claim 1 wherein generating the series of images includes:
generating the series of images in response to image compression.

8. The method of claim 1 wherein the plurality of simulated effects includes a motion blur.

9. The method of claim 1 wherein generating the series of images includes:
generating the series of images in response to focus blur.

10. The method of claim 1 wherein generating the series of images includes:
generating the series of images in response to background.

11. The method of claim 1 wherein generating the series of images includes:
generating the series of images in response to camera intrinsic characteristics.

12. The method of claim 1 wherein generating the series of images includes:
generating the series of images in response to isometric surfaces.

13. The method of claim 1 wherein the object is a portion of a human.

14. A video generator comprising:
an interface to receive, from an image capturing device, a plurality of captured images of an object, the captured images including object information representative of the object;
a path generator to generate a path of motion of the image capturing device relative to the object; and
an image generator to generate a plurality of simulated effects on each of the captured images and to generate a series of virtual images of the object and ground truth data for each virtual image from the object information, the plurality of simulated effects and the path of motion.

15. A method for generating video, the method comprising:
receiving, from an image capturing device, a plurality of captured images of an object and a parameter of the image capture device, the captured images including object information representative of the object;
generating a path of motion of the image capturing device relative to the object;
generating a plurality of simulated effects on each of the captured images;
generating a series of virtual images of the object from the object information, the parameter of the image capture device, the plurality of simulated effects and the path of motion; and
generating ground truth data for each virtual image from the object information, the parameter of the image capture device, the plurality of simulated effects and the path of motion.

16. The method of claim 15 wherein generating the path of motion includes:
generating a sequence of coordinates in response to a model of human behavior for movement of the image capture device.

* * * * *